US012629944B2

(12) United States Patent
Aizawa et al.

(10) Patent No.: US 12,629,944 B2
(45) Date of Patent: May 19, 2026

(54) LIQUID EJECTION HEAD AND LIQUID EJECTION APPARATUS

(71) Applicant: CANON KABUSHIKI KAISHA, Tokyo (JP)

(72) Inventors: So Aizawa, Kanagawa (JP); Keiji Tomizawa, Kanagawa (JP); Fumi Tanaka, Kanagawa (JP); Koichi Ishida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 18/432,596

(22) Filed: Feb. 5, 2024

(65) Prior Publication Data

US 2024/0262107 A1 Aug. 8, 2024

(30) Foreign Application Priority Data

Feb. 7, 2023 (JP) ................................ 2023-016815

(51) Int. Cl.

| | |
|---|---|
| ***B41J 2/14*** | (2006.01) |
| ***B41J 2/155*** | (2006.01) |
| ***B41J 2/175*** | (2006.01) |
| ***B41J 2/18*** | (2006.01) |
| ***B41J 11/00*** | (2006.01) |

(52) U.S. Cl.

CPC ............... *B41J 2/18* (2013.01); *B41J 2/1408* (2013.01); *B41J 2/1433* (2013.01); *B41J 2/155* (2013.01); *B41J 2/17596* (2013.01); *B41J 11/007* (2013.01)

(58) Field of Classification Search

CPC ........ B41J 2/01; B41J 2/14024; B41J 2/1404; B41J 2/1408; B41J 2/1433; B41J 2/17596; B41J 2/18; B41J 11/007; B41J 2002/14419; B41J 2002/14475; B41J 2202/11; B41J 2202/012; B41J 2202/19; B41J 2202/20

See application file for complete search history.

(56) References Cited

U.S. PATENT DOCUMENTS

2017/0197411 A1* 7/2017 Moriya .................. B41J 2/1433
2020/0108604 A1* 4/2020 Nakagawa ........... B41J 2/14072
2020/0198352 A1* 6/2020 Kato ...................... B41J 2/1626

FOREIGN PATENT DOCUMENTS

JP 2011207235 A 10/2011
JP 2017124607 A 7/2017

* cited by examiner

*Primary Examiner* — Anh T Vo

(74) *Attorney, Agent, or Firm* — Canon U.S.A., Inc. IP Division

(57) ABSTRACT

A liquid ejection head includes an element substrate provided with an ejection port row in which ejection ports are arrayed. The port includes a protruding portion protruding toward a center of the ejection port, an energy generation element configured to generate energy to eject liquid, and a pressure chamber including the energy generation element thereinside. The head has a liquid supply path for supplying liquid to the pressure chamber, and a liquid collecting path for collecting liquid from the pressure chamber. A direction in which the protruding portion protrudes is substantially parallel to a flow direction of liquid in the pressure chamber flowing from the liquid supply path to the liquid collecting path via the pressure chamber. The flow direction is same direction in the pressure chambers, and is same direction as a relative moving direction of a medium that receives liquid ejected from the liquid ejection head.

11 Claims, 22 Drawing Sheets

LIQUID EJECTION HEAD AND LIQUID EJECTION APPARATUS

BACKGROUND

Field

The present disclosure relates to a liquid ejection head and a liquid ejection apparatus.

Description of the Related Art

A liquid ejection head that ejects liquid, such as ink, from an ejection port can have the following issues. More specifically, because the liquid can become thicker near the ejection port due to evaporation of volatile components in the liquid from the ejection port, an ejection speed of liquid droplets to be ejected changes, and droplet landing accuracy is influenced.

As one of countermeasures against such a liquid thickening phenomenon, there has been known a method of circulating ink to be supplied to the liquid ejection head, along a circulation pathway. Japanese Patent Application Laid-Open No. 2017-124607 discusses a liquid ejection head that prevents clogging of an ejection port that is attributed to liquid evaporation from the ejection port, by circulating liquid in a flow path near the ejection port. Nevertheless, if an intermission period of an ejection operation becomes longer, even though liquid is circulated near the ejection port, a viscosity increase of the liquid becomes prominent, and a solid component in the liquid is sometimes firmly fixed to the vicinity of the ejection port. Thus, when a first liquid droplet is ejected after intermission, fluid resistance generated when liquid passes through the ejection port is increased by the solid component, and a landing position of the first droplet to be ejected after intermission might deviate. In view of the foregoing, Japanese Patent Application Laid-Open No. 2017-124607 discusses the liquid ejection head that reduces a deviation in landing position of the first droplet to be ejected after intermission, by changing a direction in which liquid circulates near the ejection port, and a conveyance direction of a medium that receives liquid ejected from the liquid ejection head, in accordance with the shape of the ejection port.

For the purpose of increasing the definition of a recorded image by reducing the generation of satellite droplets and ink mist in a liquid ejection head that circulates liquid in a flow path near an ejection port as discussed in Japanese Patent Application Laid-Open No. 2017-124607, a configuration in which an ejection port is provided with a protruding portion as discussed in Japanese Patent Application Laid-Open No. 2011-207235 has been applied. As a result, inventors of the present disclosure have discovered that a phenomenon in which a droplet landing position deviates in a direction different from that in Japanese Patent Application Laid-Open No. 2017-124607 has occurred after a short intermission period of several milliseconds.

SUMMARY

In view of the foregoing, the present disclosure is directed to providing a liquid ejection head that can perform higher-definition and higher-quality liquid ejection.

According to an aspect of the present disclosure, a liquid ejection head includes an element substrate provided with an ejection port row in which a plurality of ejection ports configured to eject liquid is arrayed. The ejection port includes a protruding portion protruding toward a center of the ejection port, an energy generation element configured to generate energy to eject liquid, and a pressure chamber including the energy generation element thereinside. The head includes a liquid supply path configured to supply liquid to the pressure chamber, and a liquid collecting path configured to collect liquid from the pressure chamber, wherein a direction in which the protruding portion protrudes is substantially parallel to a flow direction of liquid in the pressure chamber that flows from the liquid supply path to the liquid collecting path via the pressure chamber, wherein the flow direction is a same direction in a plurality of the pressure chambers, wherein a height H m of the pressure chamber on an upstream side in the flow direction of the liquid of a portion communicating with an ejection port portion, a length P μm in an ejection direction of liquid of the ejection port portion, and a length W μm in the flow direction of the liquid of the ejection port portion satisfy a relationship of $H^{-0.34} \times P^{-0.66} \times W > 1.7$, and wherein the flow direction of the liquid is a same direction as a relative moving direction of a medium that receives liquid ejected from the liquid ejection head in liquid ejection.

Further features of the present disclosure will become apparent from the following description of exemplary embodiments with reference to the attached drawings.

DESCRIPTION OF THE EMBODIMENTS

Hereinafter, an example of an exemplary embodiment of the present disclosure will be described with reference to the drawings. Nevertheless, the following description is not intended to limit the scope of the present disclosure. As an example, a thermal method of ejecting liquid by generating air bubbles using a heater element is employed in the present exemplary embodiment. Nevertheless, the present disclosure can also be applied to a liquid ejection head that employs a piezoelectric method that uses a piezoelectric element as an energy generation element for ejecting liquid, or other various liquid ejection methods. A liquid ejection head according to the present disclosure that ejects liquid such as ink, and a liquid ejection apparatus provided with the liquid ejection head can be applied to an apparatus such as a printer, a copier, a facsimile including a communication system, or a word processor including a printer unit. Furthermore, the liquid ejection head and the liquid ejection apparatus can be applied to an industrial recording apparatus complexly combined with various processing apparatuses. For example, the liquid ejection head and the liquid ejection apparatus can also be used for purposes such as biochip creation, electronic circuit printing, and semiconductor substrate creation.

An inkjet recording apparatus serving as a liquid ejection apparatus according to the present exemplary embodiment is configured to circulate liquid such as ink between a tank and a liquid ejection head, but another configuration may be employed. For example, a configuration of providing two tanks on an upstream side and a downstream side of a liquid ejection head, and flowing ink in a pressure chamber by flowing ink from one tank to the other tank without circulating ink may be employed. The liquid ejection head according to the present exemplary embodiment is a so-called line-type (page wide type) head having a length corresponding to the width of a medium that receives liquid ejected from the liquid ejection head, but the present disclosure can also be applied to a so-called serial type liquid ejection head that performs liquid ejection while performing scanning with respect to a medium. Examples of the serial type liquid ejection head include a liquid ejection head having a configuration provided with one element substrate for black ink and one element substrate for each color ink, but the configuration of the liquid ejection head is not limited to this. A short line head with a length shorter than the width of a medium may be created by arranging several element substrates in such a manner as to overlap ejection ports in an ejection port row direction, and the short line head may be scanned with respect to the medium.

Hereinafter, an example of an exemplary embodiment of the present disclosure will be described with reference to the drawings.

<Overall Configuration of Liquid Ejection Apparatus>

Figure 1:
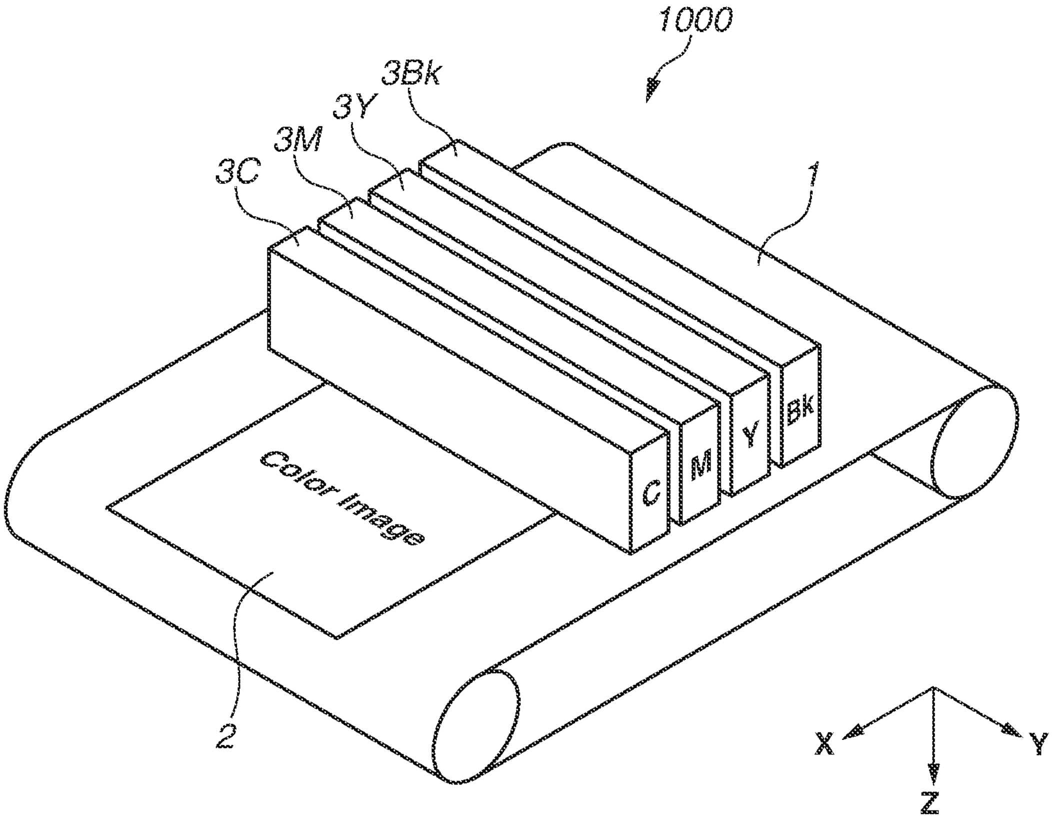
FIG. 1 is a diagram illustrating a liquid ejection apparatus according to an exemplary embodiment of the present disclosure.

FIG. 1 is a diagram illustrating an example of a liquid ejection apparatus according to the present exemplary embodiment. The liquid ejection apparatus according to the present exemplary embodiment is an inkjet apparatus (hereinafter, will be simply referred to as an apparatus) 1000 that forms a color image onto a medium 2 by ejecting cyan (C) ink, magenta (M) ink, yellow (Y) ink, and black (Bk) ink. In FIG. 1, an X direction is a conveyance direction of the medium 2 that receives ejected liquid, a Y direction is a width direction of the medium 2, and a Z direction is a liquid ejection direction.

FIG. 1 illustrates the apparatus 1000 having a configuration in which liquid ejection heads 3 directly apply ink to the medium 2 conveyed in the X direction. The medium 2 is placed on a conveyance unit 1, and is conveyed at a predetermined speed in the X direction below four liquid ejection heads 3 (3C, 3M, 3Y, 3Bk) that eject different-color inks. In FIG. 1, the four liquid ejection heads 3Bk, 3Y, 3M, and 3C are arranged in this order in the X direction, and black ink, yellow ink, magenta ink, and cyan ink are applied to the medium 2 in this order. In each of the liquid ejection heads 3, a plurality of ejection ports for ejecting ink is arrayed in the Y direction.

FIG. 1 illustrates a cut sheet as the medium 2, but the medium 2 may be a continuous sheet supplied from roll paper. In addition, the medium 2 is not limited to paper, and may be a film.

In the present exemplary embodiment, the description has been given of the liquid ejection apparatus having a configuration in which one liquid ejection head ejects single-color ink (i.e., one type of liquid), but the liquid ejection apparatus may have a configuration in which one liquid ejection head ejects a plurality of colors of inks.

Figure 2:
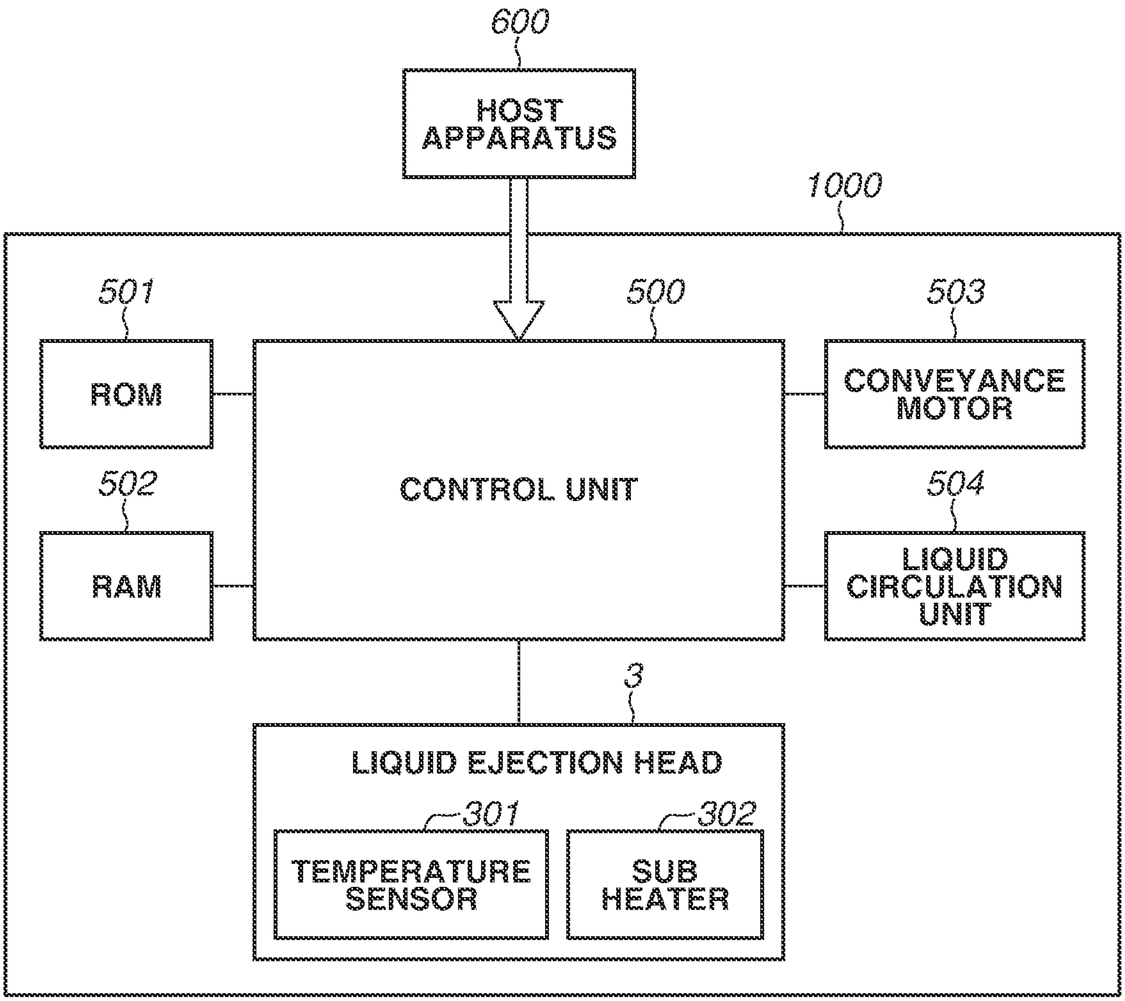
FIG. 2 is a conceptual diagram illustrating a control system according to an exemplary embodiment of the present disclosure.

FIG. 2 is a block diagram illustrating a control configuration in the liquid ejection apparatus 1000. A control unit 500 includes a central processing unit (CPU), and the control unit 500 controls the entire liquid ejection apparatus 1000 while using a random access memory (RAM) 502 as a work area in accordance with programs and various parameters that are stored in a read-only memory (ROM) 501. The control unit 500 performs predetermined image processing on image data received from a connected external host apparatus 600, in accordance with programs and parameters stored in the ROM 501, and generates ejection data that enables the liquid ejection heads 3 to eject ink. Then, the control unit 500 drives the liquid ejection heads 3 in accordance with the ejection data, and the control unit 500 causes the liquid ejection heads 3 to eject ink at a predetermined frequency.

During an ejection operation performed by the liquid ejection heads 3, the control unit 500 drives a conveyance motor 503 to convey the medium 2 in the X direction at a speed corresponding to a drive frequency. An image following the image data received from the host apparatus 600 is accordingly formed on the medium 2. Information regarding an area of an ejection port to be used for ejection in the liquid ejection heads 3 is stored in the ROM 501 in such a manner as to be rewritable for each of the liquid ejection heads 3. A setting method of the used area will be described in detail below.

<Circulation Pathway of Liquid>

Figure 3:
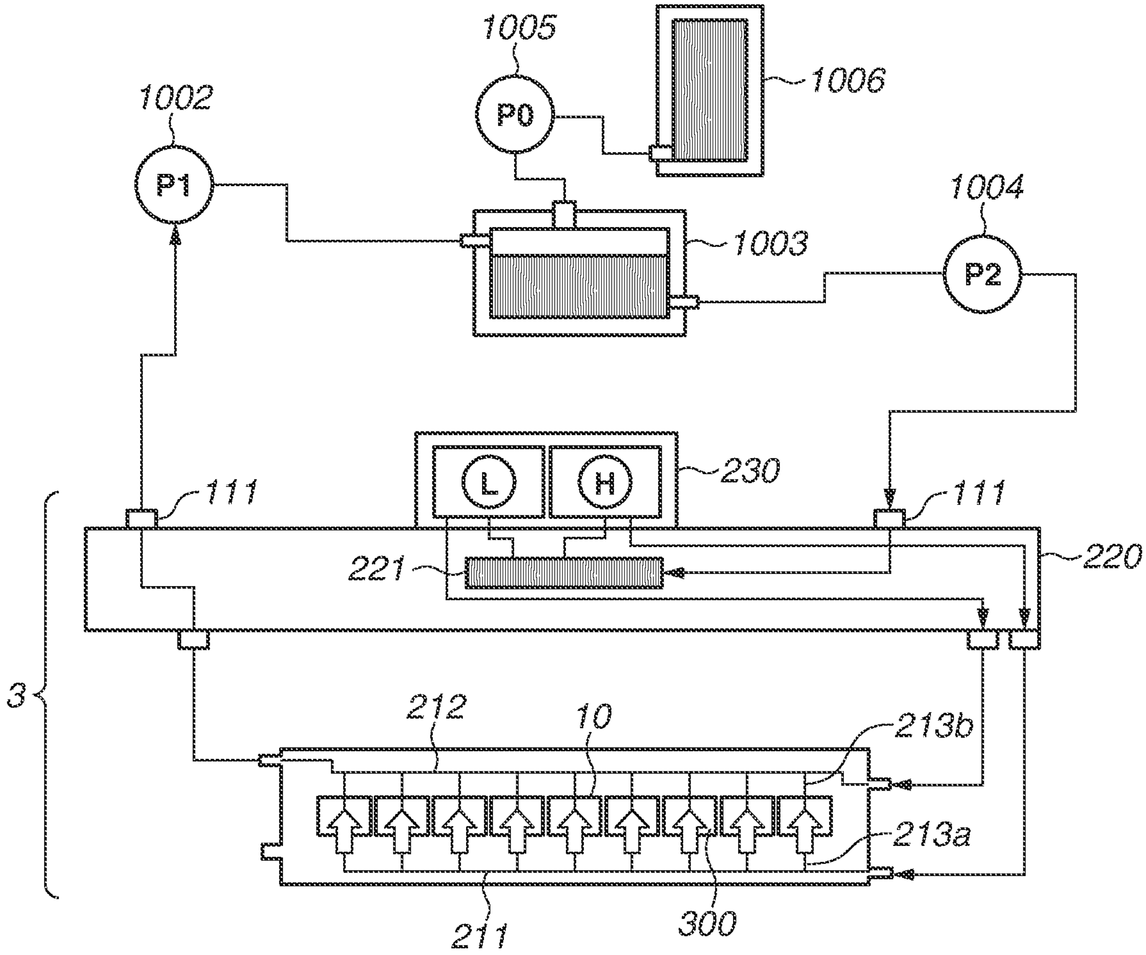
FIG. 3 is a schematic diagram illustrating a circulation pathway of liquid according to an exemplary embodiment of the present disclosure.

FIG. 3 is a schematic diagram illustrating a circulation pathway of liquid in the liquid ejection apparatus according to the present exemplary embodiment. The liquid ejection head 3 is fluidically connected to a first circulation pump 1002 and a buffer tank 1003. FIG. 3 illustrates only a pathway on which ink of the liquid ejection head 3 that corresponds to single-color ink flows, but the main body of the apparatus 1000 is provided with circulation pathways that correspond to the number of types of ink to be ejected.

The buffer tank 1003 that is connected with a main tank 1006 and serves as a sub tank includes an air communication port (not illustrated) that connects the inside and the outside of the tank. And the air communication port can discharge air bubbles in ink to the outside. The buffer tank 1003 is also connected with a replenishing pump 1005. When liquid is consumed in the liquid ejection head 3 by ink being ejected (discharged) from an ejection port of the liquid ejection head 3, such as recording or suction recovery that is to be executed by ink ejection, the replenishing pump 1005 transfers ink corresponding to consumed ink, from the main tank 1006 to the buffer tank 1003.

The first circulation pump 1002 has a role of extracting liquid from a liquid connection portion 111 of the liquid ejection head 3 and flowing the liquid to the buffer tank 1003. When the liquid ejection head 3 is driven, a certain amount of ink is flowed in a common collecting flow path 212 by the first circulation pump 1002.

A negative pressure control unit 230 is provided between pathways to a second circulation pump 1004 and a liquid ejection unit 300. The negative pressure control unit 230 has a function of operating in such a manner as to maintain a pressure on the downstream side (the liquid ejection unit 300 side) of the negative pressure control unit 230 at a preset constant pressure even in a case where a flow amount of a circulatory system varies due to a difference in Duty at which recording is performed.

As illustrated in FIG. 3, the negative pressure control unit 230 includes two pressure adjustment mechanisms, and mutually-different control pressures are set in the respective pressure adjustment mechanisms. Out of the two pressure adjustment mechanisms, a pressure adjustment mechanism in which a relatively-high pressure is set will be referred to as a negative pressure control unit 230H (denoted by H in FIG. 3), and a pressure adjustment mechanism in which a relatively-low pressure is set will be referred to as a negative pressure control unit 230L (denoted by L in FIG. 3). The negative pressure control units 230H and 230L are respectively connected to a common supply flow path 211 and a common collecting flow path 212 in the liquid ejection unit 300 via the inside of the liquid supply unit 220. The liquid ejection unit 300 is provided with the common supply flow path 211, the common collecting flow path 212, and an individual supply flow path 213*a* and an individual collecting flow path 213*b* that communicate with each element substrate 10. Because the individual flow paths 213 communicate with the common supply flow path 211 and the common collecting flow path 212, part of liquid flowed by the second circulation pump 1004 passes through an internal flow path of the element substrate 10 from the common supply flow path 211, and flows to the common collecting flow path 212 (arrow in FIG. 3). This is because there is a pressure difference between a pressure adjustment mechanism H connected to the common supply flow path 211, and a pressure adjustment mechanism L connected to the common collecting flow path 212, and the first circulation pump 1002 is connected only to the common collecting flow path 212.

In this manner, in the liquid ejection unit 300, a liquid flow passing through the inside of the common collecting flow path 212, and a liquid flow passing through the inside of each element substrate 10 from the common supply flow path 211 to the common collecting flow path 212 are generated. Thus, heat generated in each element substrate 10 can be discharged to the outside of the element substrate 10 by the flow from the common supply flow path 211 to the common collecting flow path 212.

With such a configuration, it is possible to prevent thickening of ink by generating ink flows also in an ejection port and a pressure chamber that are not involved in recording (i.e., not performing liquid ejection) while recording is performed by the liquid ejection heads 3. In addition, it is possible to discharge thickened ink and a foreign object in ink to the common collecting flow path 212. Thus, the liquid ejection heads 3 of the present exemplary embodiment are able to execute high-speed and high image quality recording.

<Configuration of Liquid Ejection Head>

Figure 4A:
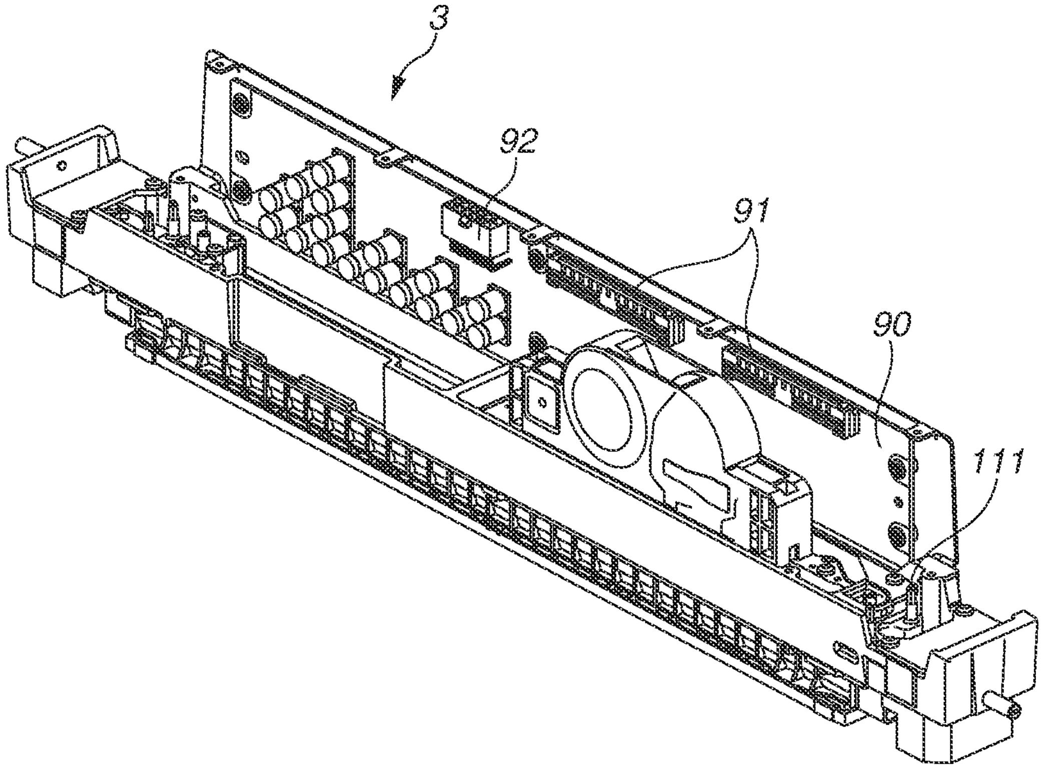
FIGS. 4A and 4B are perspective views illustrating a liquid ejection head according to an exemplary embodiment of the present disclosure.
Figure 4B:
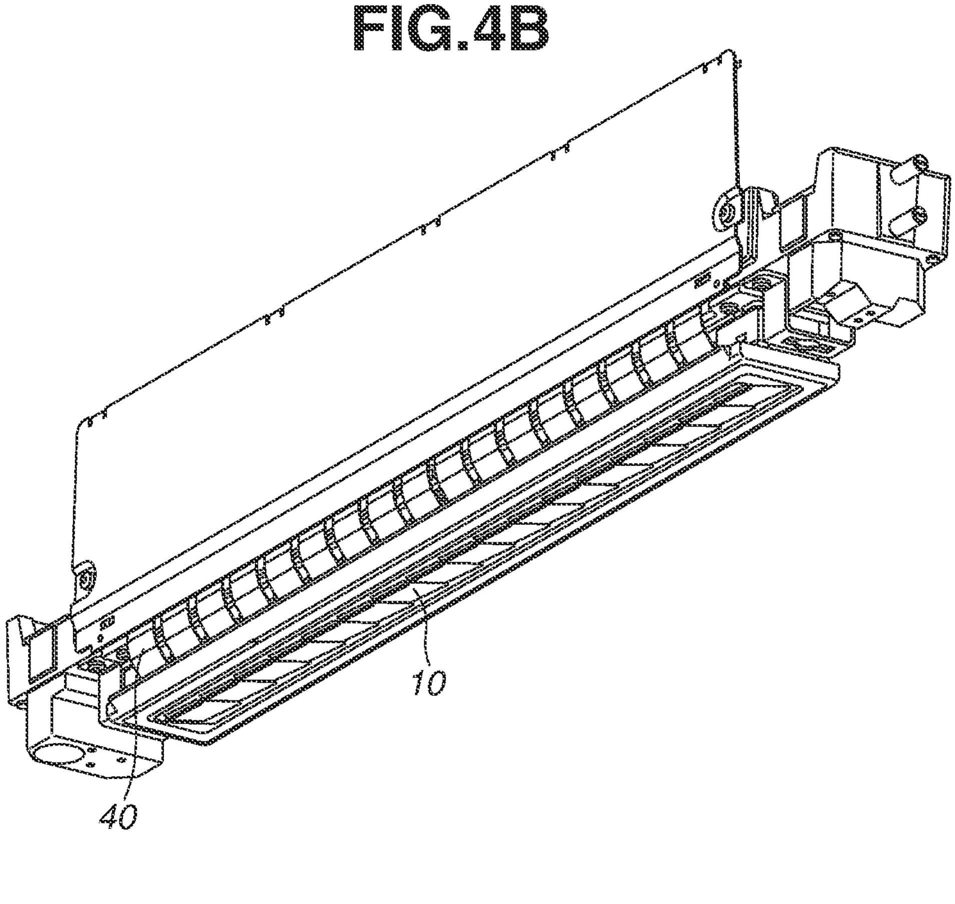

FIGS. 4A and 4B are perspective views of the liquid ejection head 3 according to the present exemplary embodiment. The liquid ejection head 3 is a line-type liquid ejection head in which 17 element substrates 10 that can eject ink are linearly arrayed (arranged in line). As illustrated in FIGS. 4A and 4B, the liquid ejection head 3 includes the element substrates 10, a signal input terminal 91, and a power supply terminal 92. The signal input terminal 91 and the power supply terminal 92 are electrically connected via a flexible wiring substrate 40 and an electric wiring substrate 90. The signal input terminal 91 and the power supply terminal 92 are electrically connected with the control unit 500 of the liquid ejection apparatus 1000, and each supply an ejection drive signal and power necessary for ejection to the element substrates 10. By consolidating cables using an electronic circuit in the electric wiring substrate 90, it is possible to reduce the number of signal input terminals 91 and the number of power supply terminals 92 as compared with the number of element substrates 10. With this configuration, it is possible to reduce the number of electrically-connected members that need to be removed when the liquid ejection head 3 is assembled to the liquid ejection apparatus 1000, or when the liquid ejection head 3 is replaced. As illustrated in FIG. 4A, the liquid connection portion 111 provided on one side of the liquid ejection head 3 is connected with a liquid supply system of the liquid ejection apparatus 1000. Ink is accordingly supplied from the liquid supply system of the liquid ejection apparatus 1000 to the liquid ejection head 3, and ink that has passed through the inside of the liquid ejection head 3 is collected to the liquid supply system of the liquid ejection apparatus 1000. In this manner, ink can circulate via the pathway of the liquid ejection apparatus 1000 and the pathway of the liquid ejection head 3.

Figure 5:
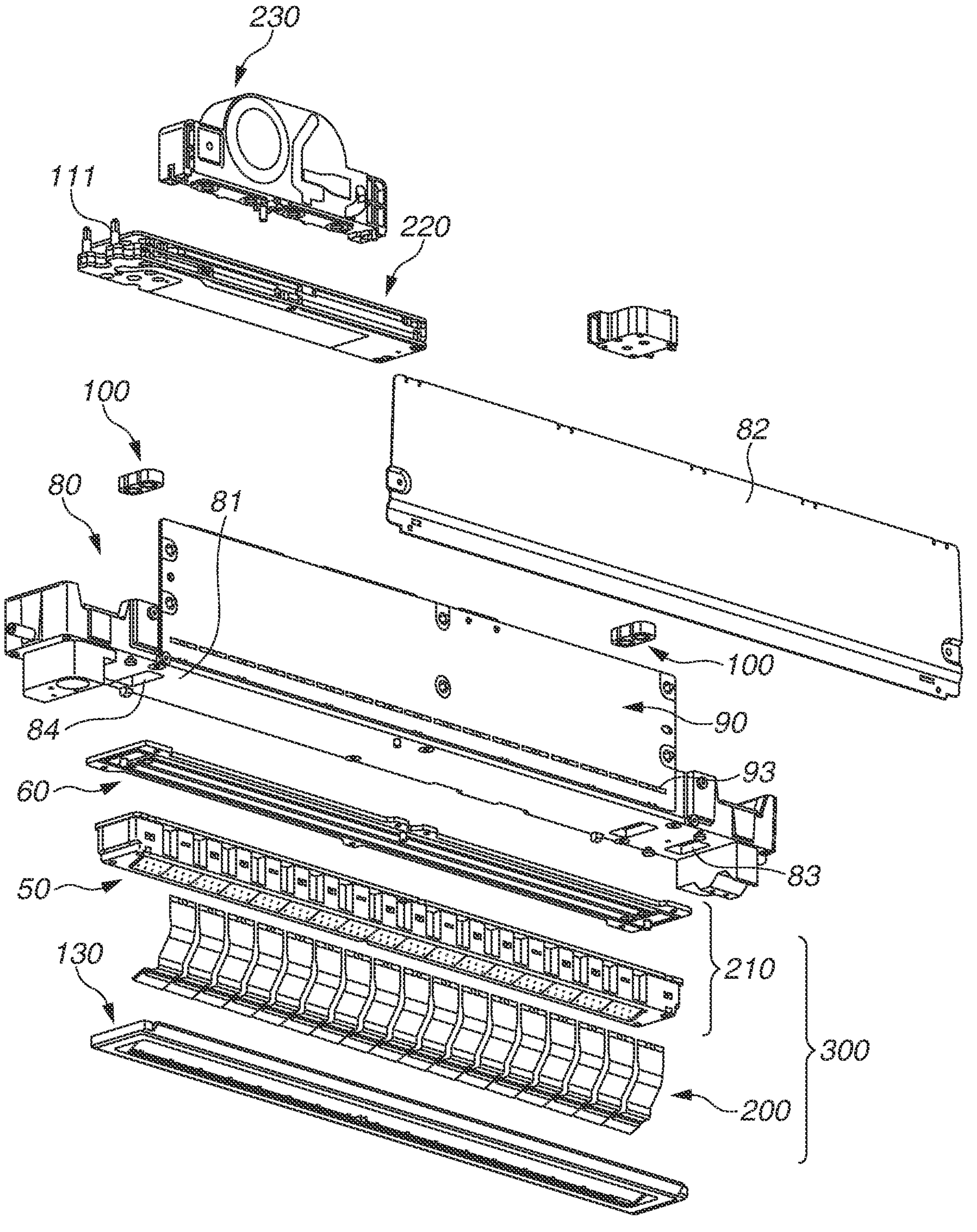
FIG. 5 is an exploded perspective view of the liquid ejection head according to an exemplary embodiment of the present disclosure.

FIG. 5 is an exploded perspective view illustrating components or units included in the liquid ejection head 3. The liquid ejection unit 300, the liquid supply unit 220, and the electric wiring substrate 90 are attached to a housing 80. In addition to the liquid connection portion 111 provided in the liquid supply unit 220, a filter 221 (FIG. 3) communicating with each opening of the liquid connection portion 111 is provided inside the liquid supply unit 220 to remove a foreign object in supplied ink. Liquid having passed through the filter 221 is supplied to the negative pressure control unit 230 arranged on the liquid supply unit 220. The negative pressure control unit 230 is a unit including a pressure adjustment valve, and by the function of a valve and a spring member provided in each portion, a pressure loss change inside the liquid supply system of the liquid ejection apparatus 1000 (supply system on the upstream side of the liquid ejection head 3) that occurs in accordance with a variation in liquid flow amount is drastically decreased. With this configuration, it is possible to stabilize a negative pressure change on the downstream side of the negative pressure control unit 230 (the liquid ejection unit 300 side) within a certain constant range. Two pressure adjustment valves are incorporated in the negative pressure control unit 230 and are set to different control pressures. A pressure adjustment valve set to a high pressure communicates with the common supply flow path 211 in the liquid ejection unit 300 via the liquid supply unit 220, and a pressure adjustment valve set to a low pressure communicates with the common collecting flow path 212 in the liquid ejection unit 300 via the liquid supply unit 220.

The housing 80 includes a liquid ejection unit support portion 81 and an electric wiring substrate support portion 82, supports the liquid ejection unit 300 and the electric wiring substrate 90, and ensures the rigidity of the liquid ejection head 3. The electric wiring substrate support portion 82 is a portion for supporting the electric wiring substrate 90, and is fixed to the liquid ejection unit support portion 81 by screwing. The liquid ejection unit support portion 81 is provided with openings 83 and 84 into which rubber joints 100 are inserted. Liquid supplied from the liquid supply unit 220 is guided via the rubber joints 100 to a second flow path member 60 included in the liquid ejection unit 300.

Next, a configuration of a flow path member 210 included in the liquid ejection unit 300 will be described. As illustrated in FIG. 5, the flow path member 210 is obtained by stacking a first flow path member 50 and the second flow path member 60. The flow path member 210 is a flow path member that distributes liquid supplied from the liquid supply unit 220, to each ejection module 200, and returns liquid circulating from each ejection module 200, to the liquid supply unit 220. A plurality of ejection modules 200 is bonded to a bonding surface of the first flow path member 50 by an adhesive (not illustrated). In addition, the flow path member 210 is fixed to the liquid ejection unit support portion 81 by screwing, and warping and deformation of the flow path member 210 are thereby suppressed.

Figure 6A:
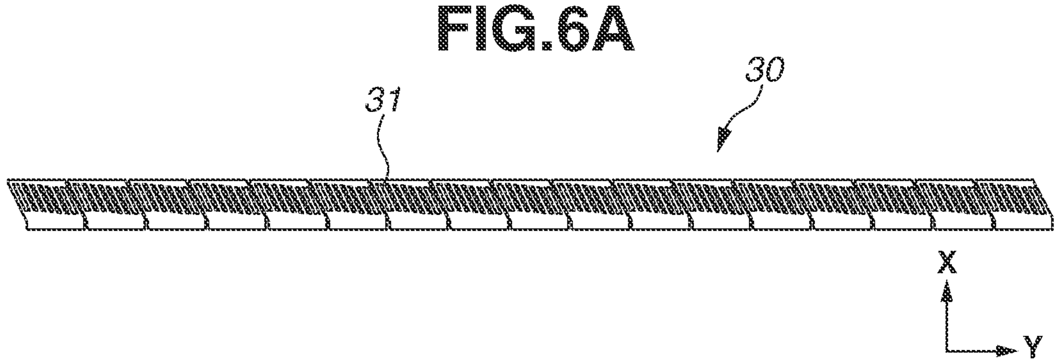
FIGS. 6A to 6D are plan views of a flow path member according to an exemplary embodiment of the present disclosure.
Figure 6B:
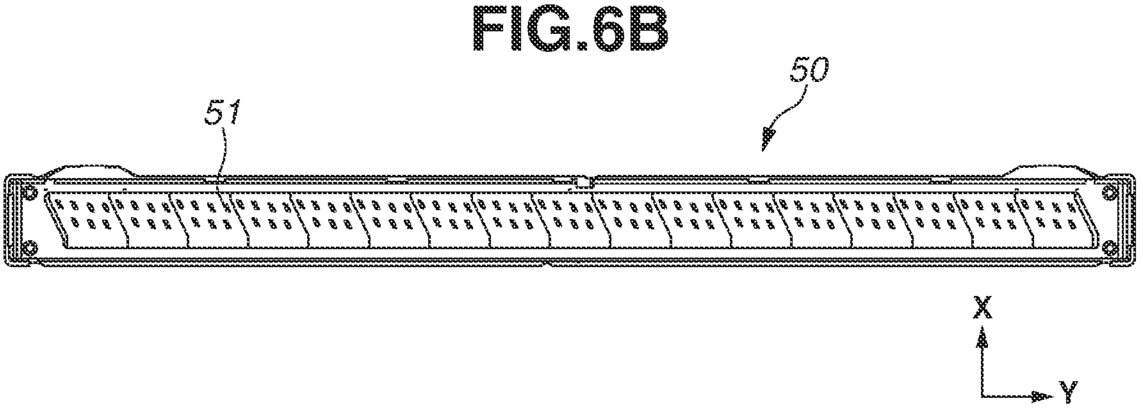
Figure 6C:
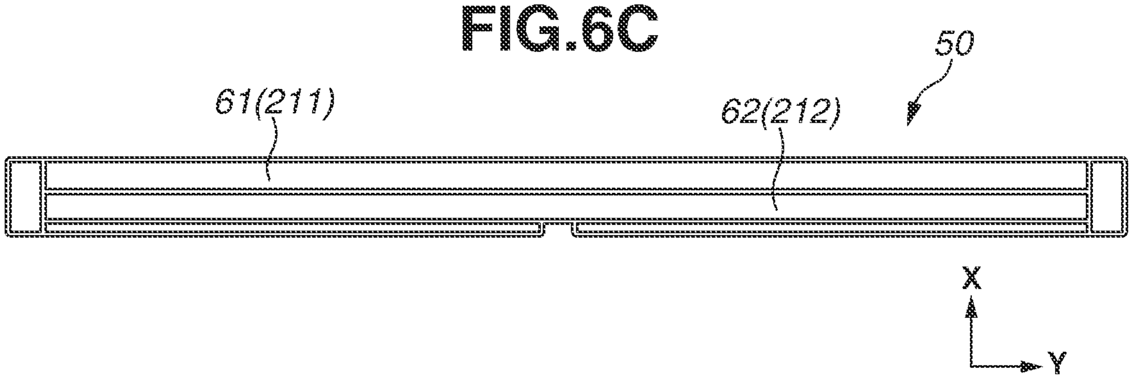
Figure 6D:
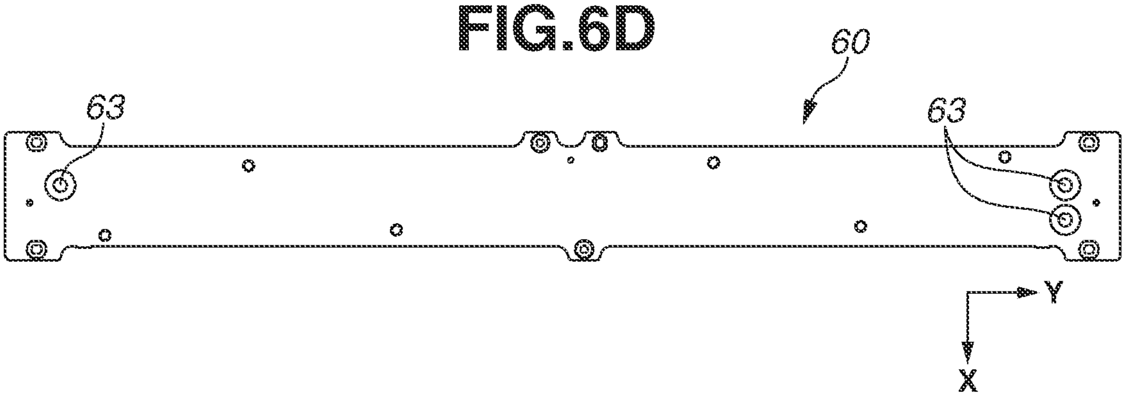

FIGS. 6A to 6D are diagrams illustrating a detailed configuration of the flow path member 210. FIG. 6A illustrates a support member 30 provided on the surface of the first flow path member 50 on the side on which the ejection modules 200 are mounted, and FIG. 6B illustrates a contact surface of the first flow path member 50 on which the first flow path member 50 contacts the support member 30. FIG. 6C is a cross-sectional view on a surface of the first flow path member 50 that is vertical to the Z direction, and is near the center in the Z direction, and FIG. 6D illustrates a surface of the second flow path member 60 on which the second flow path member 60 contacts the liquid ejection unit support portion 81. FIGS. 6A to 6C are diagrams viewed from the ejection module 200 side, and FIG. 6D is a diagram viewed from the liquid ejection unit support portion 81 side.

On the opposite surface of the first flow path member 50 relative to the second flow path member 60, a plurality of support members 30 arrayed in the Y direction is arranged, and one element substrate 10 is arranged for each support member 30. By adjusting the number of arrayed ejection modules 200, liquid ejection heads 3 with various sizes can be formed.

As illustrated in FIG. 6A, the support member 30 fluidically connects with the element substrate 10 on a surface contacting the element substrate 10, and includes a support member communication port 31 that becomes the individual supply flow path 213*a* and individual collecting flow path 213*b* described above with reference to FIG. 3. As illustrated in FIG. 6B, the support member communication port 31 fluidically communicates with the common supply flow path 211 or the common collecting flow path 212 via a communication port 51 included in the first flow path member 50.

As illustrated in FIG. 6C, in a middle layer that exists near the center in the Z direction of the first flow path member 50, common flow path grooves 61 and 62 that become the common supply flow path 211 and the common collecting flow path 212 described with reference to FIG. 3 extend in the Y direction. As illustrated in FIG. 6D, common communication ports 63 fluidically communicating with the liquid supply unit 220 are formed at both ends or one end of the common flow path grooves 61 and 62.

Figure 7A:
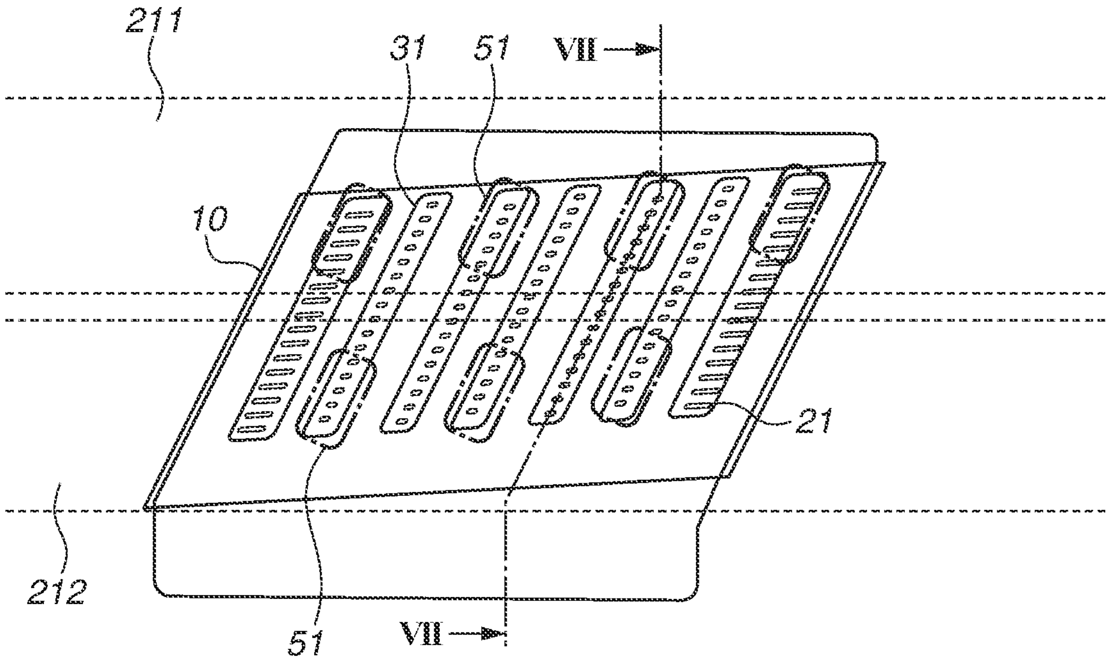
FIG. 7A is a transparent view of the flow path member according to an exemplary embodiment of the present disclosure.
Figure 7B:
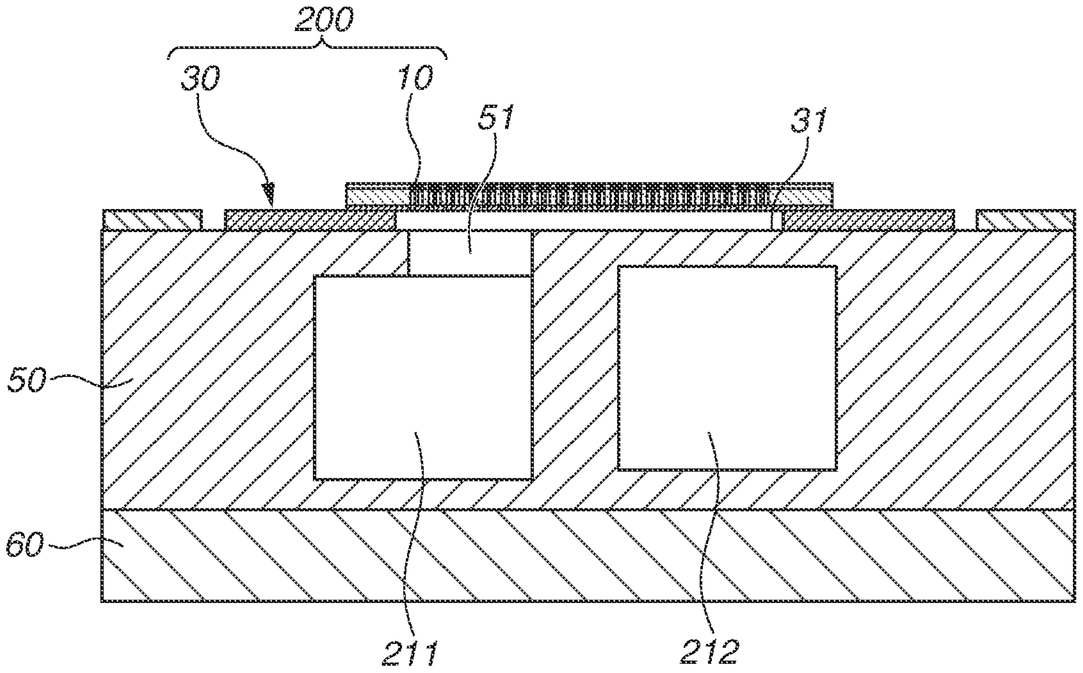
FIG. 7B is a cross-sectional view of the liquid ejection head.

FIGS. 7A and 7B are a transparent view and a cross-sectional view illustrating a flow path structure formed inside the liquid ejection unit 300. FIG. 7A is an enlarged transparent view illustrating the flow path member 210 from the Z direction, and FIG. 7B is a cross-sectional view taken along a line VII-VII in FIG. 7A.

The element substrate 10 of the ejection module 200 is placed on the communication port 51 of the first flow path member 50 via the support member 30. FIG. 7B illustrates only the communication port 51 corresponding to the common supply flow path 211, but in another cross-section, the common collecting flow path 212 and the communication port 51 communicate with each other as illustrated in FIGS. 6A to 6D. In the support member 30 and the element substrate 10 included in each ejection module 200, a flow path for supplying ink from the first flow path member 50 to an energy generation element 15 (refer to FIGS. 9A to 9C) provided on the element substrate 10 is formed. Furthermore, in the support member 30 and the element substrate 10, a flow path for collecting (circulating) a part or all of liquid supplied to the energy generation element 15, to the first flow path member 50 is formed.

As described above, the common supply flow path 211 is connected to the negative pressure control unit 230H set to a relatively-high pressure, and the common collecting flow path 212 is connected to the negative pressure control unit 230L set to a relatively-low pressure. An ink supply pathway for supplying ink to a flow path formed in the element substrate 10, through the common communication port 63 (refer to FIGS. 6A to 6D), the common supply flow path 211, and the support member communication port 31 is formed. In a similar manner, an ink collecting pathway including the support member communication port 31, the communication port 51, the common collecting flow path 212, the common communication port 63 (refer to FIGS. 6A and 6D) is formed from the flow path in the element substrate 10. In this manner, while ink is circulated, an ejection operation following ejection data is performed in the element substrate 10, and ink that has been supplied from the ink supply pathway and has not been consumed by the ejection operation is collected by the ink collecting pathway.

<Configuration of Ejection Module>

Figure 8A:
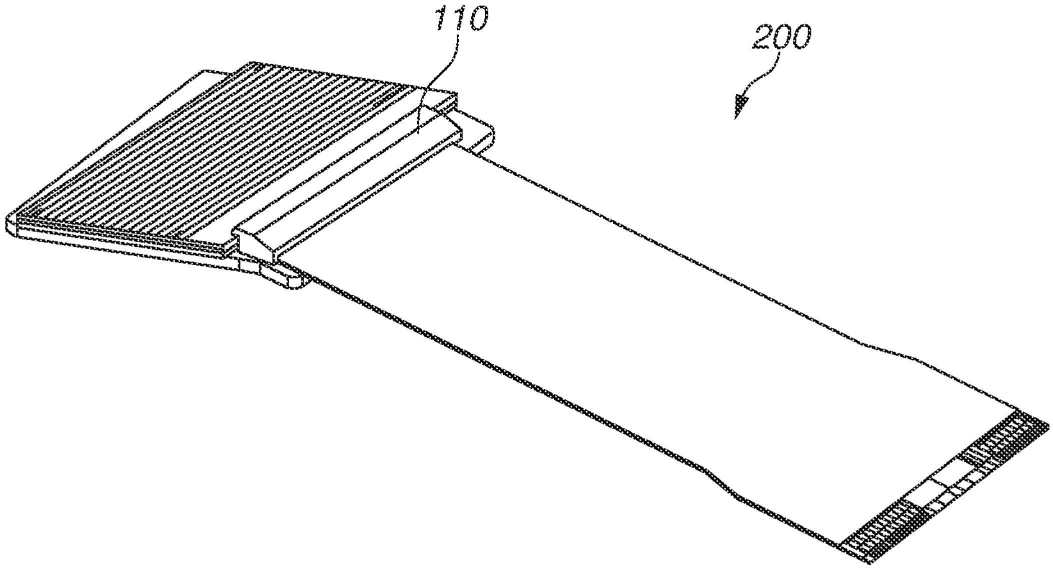
FIG. 8A is a perspective view of an ejection module according to an exemplary embodiment of the present disclosure.
Figure 8B:
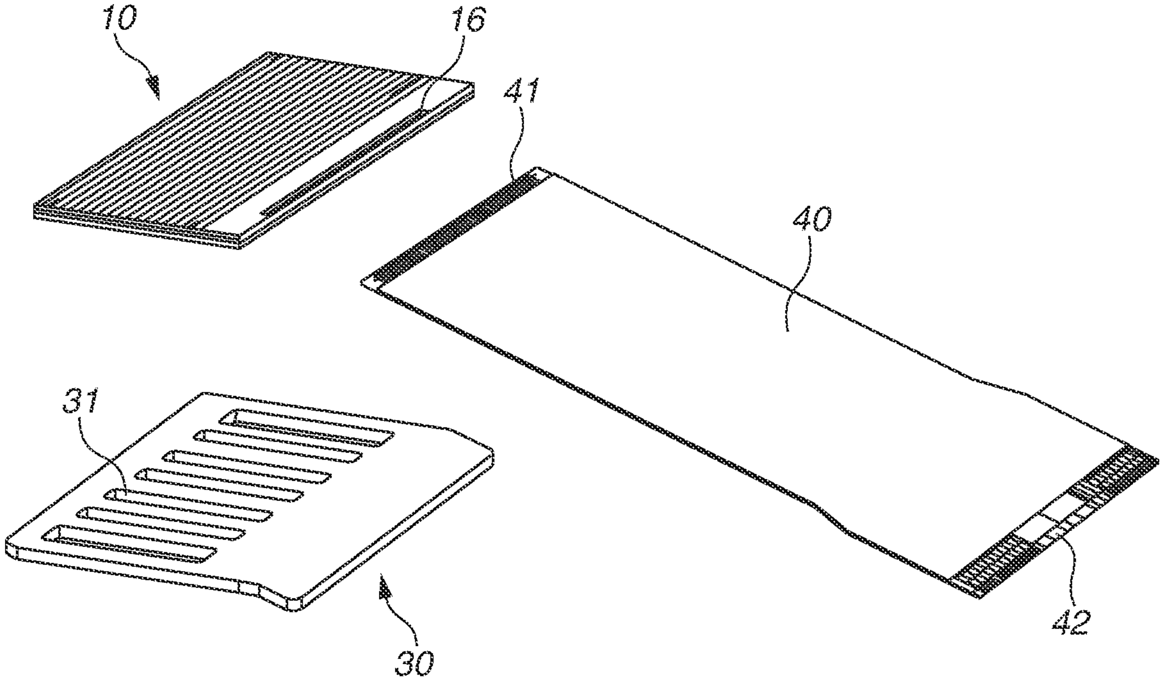
FIG. 8B is an exploded perspective view of the ejection module.

FIG. 8A is a perspective view illustrating one ejection module 200, and FIG. 8B is an exploded view illustrating the one ejection module 200. As a manufacturing method of the ejection module 200, first of all, the element substrate 10 and the flexible wiring substrate 40 are bonded onto the support member 30 in which the support member communication port 31 is preliminarily provided. After that, a terminal 16 on the element substrate 10 and a terminal 41 on the flexible wiring substrate 40 are electrically connected by wire bonding, and then, a wire bonding portion (electric connection portion) is sealed by covering the wire bonding portion (electric connection portion) with a sealing member 110. A terminal 42 on the opposite side of the flexible wiring substrate 40 relative to the element substrate 10 is electrically connected with a connection terminal 93 (refer to FIG. 5) of the electric wiring substrate 90. Because the support member 30 serves as a support member that supports the element substrate 10, and also serves as a flow path member that fluidically connects the element substrate 10 and the flow path member 210, it is desirable that the support member 30 has substantial flatness and can be bonded with the element substrate 10 with sufficiently-high reliability. As the material, for example, alumina or resin material is desirable.

<Configuration of Element Substrate>

Figure 9A:
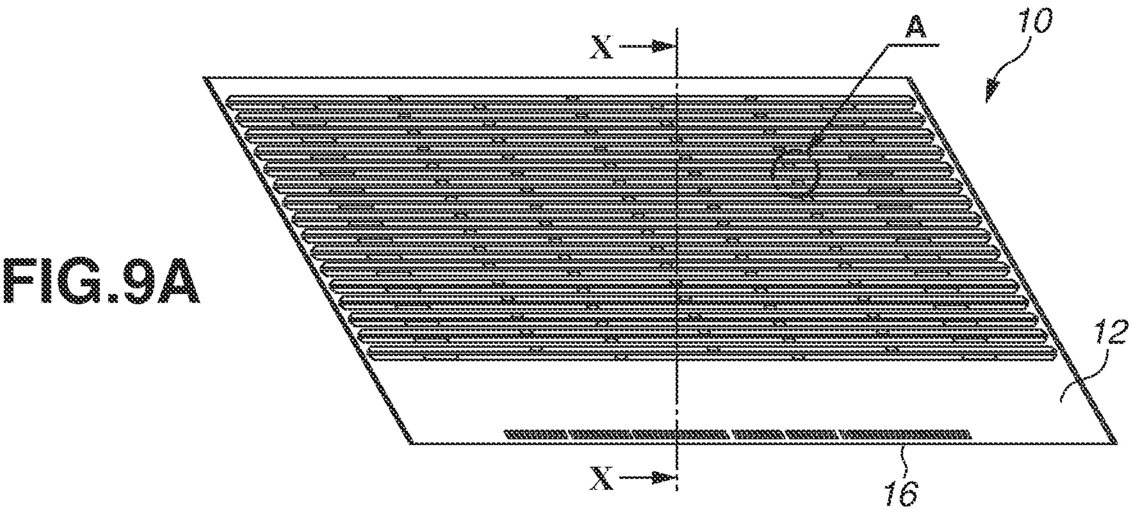
FIGS. 9A to 9C are plan views of an element substrate according to an exemplary embodiment of the present disclosure.
Figure 9B:
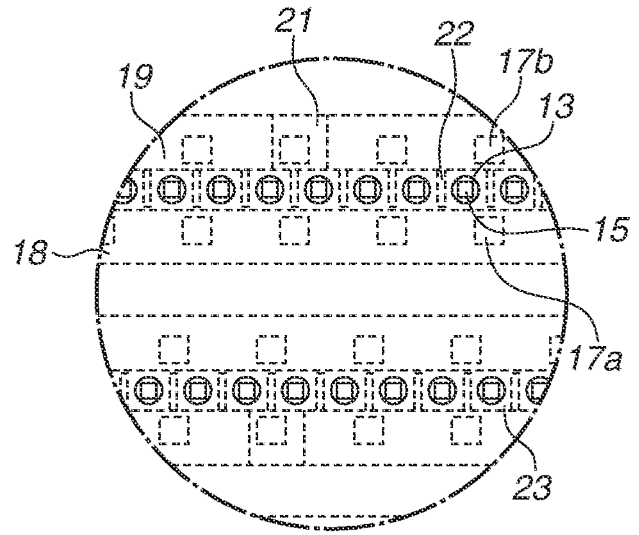
Figure 9C:
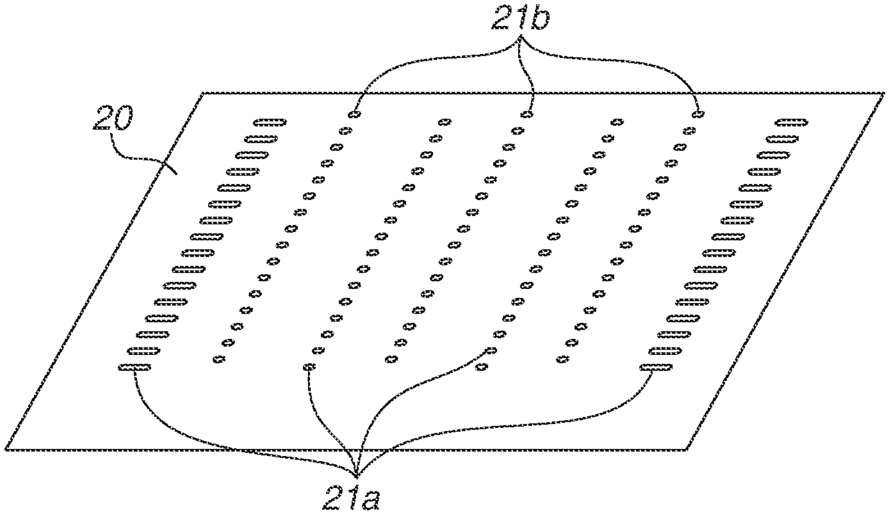
Figure 10:
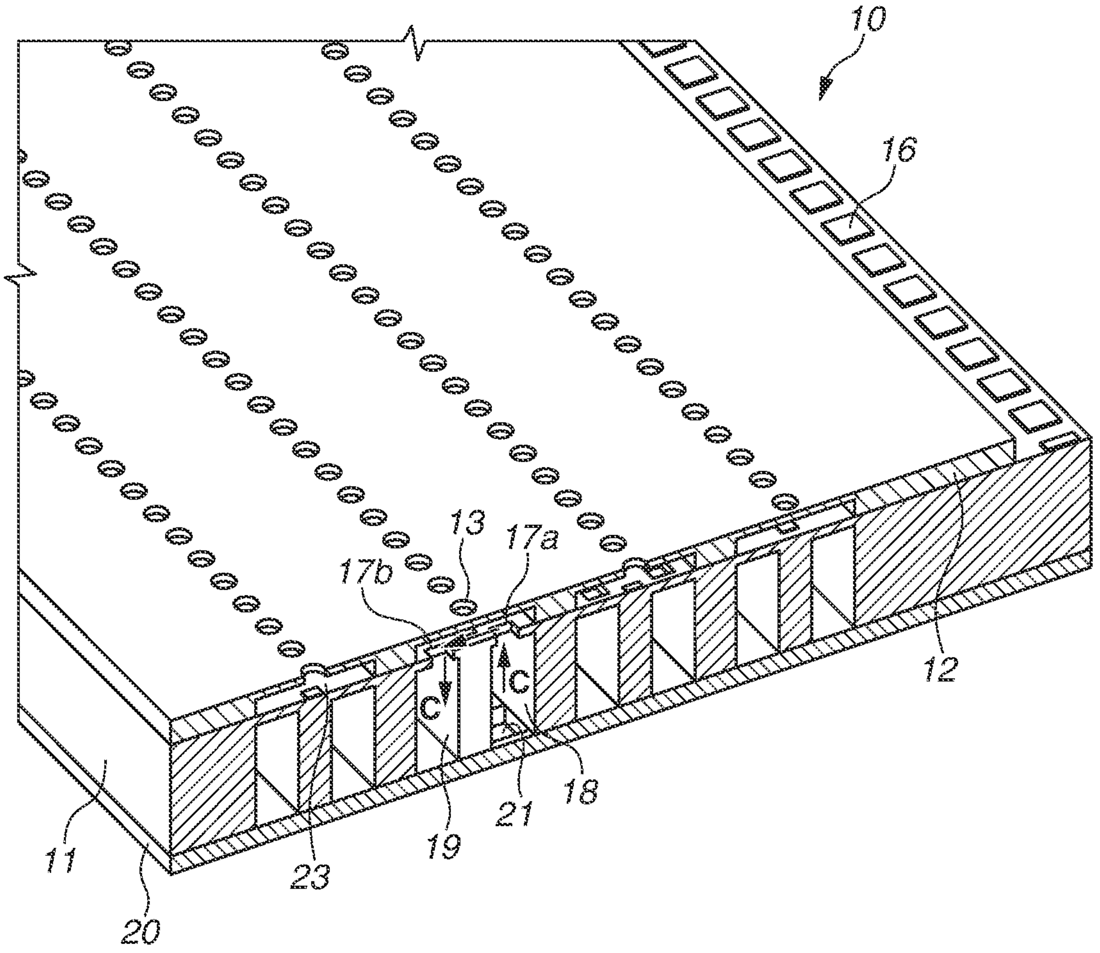
FIG. 10 is a cross-sectional view of the element substrate according to an exemplary embodiment of the present disclosure.

A configuration of the element substrate 10 according to the present exemplary embodiment will be described. FIG. 9A is a plan view illustrating a surface of the element substrate 10 that is on the side on which ejection ports 13 are formed, FIG. 9B is an enlarged view of a portion indicated by "A" in FIG. 9A, and FIG. 9C is a plan view illustrating the rear surface of the element substrate 10 illustrated in FIG. 9A. FIG. 10 is a cross-sectional perspective view of the element substrate 10 that is taken along a line X-X in FIG. 9A. Hereinafter, a direction in which an ejection port row in which a plurality of ejection ports 13 is arrayed extends will be referred to as an "ejection port row direction".

As illustrated in FIG. 9B, an energy generation element 15 serving as a heater element (pressure generation element) for foaming liquid using generated heat energy is arranged at a position corresponding to each ejection port 13. A pressure chamber 23 including the energy generation element 15 thereinside is partitioned by a partition wall 22. The energy generation element 15 is electrically connected with the terminal 16 by an electric cable (not illustrated) provided on the element substrate 10. Then, based on a pulse signal input from a control circuit of the liquid ejection apparatus 1000 via the electric wiring substrate 90 (refer to FIG. 5) and the flexible wiring substrate 40 (refer to FIGS. 8A and 8B), the energy generation element 15 generates heat and boils liquid. By the force of bubbles generated by the boiling, liquid is ejected from the ejection port 13. As illustrated in FIG. 9B, along each ejection port row, a liquid supply path 18 extends on one side, and a liquid collecting path 19 extends on the other side. The liquid supply path 18 and the liquid collecting path 19 are flow paths that are provided in the element substrate 10 and extend in the ejection port row direction, and communicate with the ejection port 13 via a supply port 17*a* and a collecting port 17*b*, respectively.

As illustrated in FIGS. 9C and 10, a sheet-like cover plate 20 is stacked on the side opposite to the surface on which the ejection ports 13 are formed. As illustrated in FIG. 9C, a plurality of openings 21 communicating with the liquid supply path 18 and the liquid collecting path 19 to be described below is provided on the cover plate 20. In the present exemplary embodiment, in the cover plate 20, four supply openings 21*a* are provided for one liquid supply path 18 and three collecting openings 21*b* are provided for one liquid collecting path 19, but the number of openings is not limited to this. As illustrated in FIG. 9B, each opening 21 in the cover plate 20 communicates with the communication port 51 illustrated in FIG. 7A. The cover plate 20 is desirably made of material having sufficient corrosion resistance to liquid, and opening shapes and opening positions of the openings 21 are required to be highly accurate, to supply ink to the pressure chamber 23. Thus, it is desirable to provide the openings 21 by a photolithography technique using photosensitive resin material or a silicon plate as the material of the cover plate 20. In this manner, the cover plate 20 converts the pitch of flow paths based on the openings 21, and the cover plate 20 is desirably formed of a film-shaped member with a thickness of about 30 to 600 μm from the aspect of pressure loss, strength, and workability.

Next, a flow of liquid in the element substrate 10 will be described. FIG. 10 illustrates a configuration in which four ejection port rows are formed in an ejection port forming member 12 on the element substrate 10, but the number of ejection port rows is not limited to four, and can be arbitrarily selected. In the element substrate 10, a substrate 11 formed of silicon and the ejection port forming member 12 formed of photosensitive resin are stacked, and the cover plate 20 is bonded to the back surface of the substrate 11.

The cover plate 20 has a function as a lid forming a part of a wall of the liquid supply path 18 and the liquid collecting path 19 formed in the substrate 11 of the element substrate 10. In the element substrate 10, the energy generation element 15 (refer to FIGS. 9A to 9C) is formed on one surface side of the substrate 11, and grooves forming the liquid supply path 18 and the liquid collecting path 19 that extend along the ejection port row are formed on the back surface side. The liquid supply path 18 and the liquid collecting path 19 that are formed by the substrate 11 and the cover plate 20 are respectively connected with the common supply flow path 211 and the common collecting flow path 212 in the flow path member 210 (refer to FIGS. 7A and 7B), and a differential pressure is generated between the liquid supply path 18 and the liquid collecting path 19. By the difference pressure, a circulating flow C in which liquid in the liquid supply path 18 provided in the substrate 11 flows to the liquid collecting path 19 via the supply port 17*a*, the pressure chamber 23, and the collecting port 17*b* is formed (flow indicated by an arrow C in FIG. 10). By this flow, in the ejection ports 13 and the pressure chamber 23 that are not performing an ejection operation, thickened ink generated due to evaporation from the ejection ports 13, bubbles, and foreign objects can collect in the liquid collecting path 19. It is also possible to prevent ink in the ejection ports 13 and the pressure chamber 23 from being thickened, and prevent the density of color material from increasing.

As illustrated in FIGS. 7A and 7B, liquid collected to the liquid collecting path 19 is collected to the support member communication port 31 of the support member 30, the communication port 51 of the first flow path member 50, and the common collecting flow path 212 in this order through the openings 21 of the cover plate 20 and the support member communication port 31 of the support member 30, and collected to a supply pathway of the liquid ejection apparatus 1000.

That is, liquid supplied from the liquid ejection apparatus main body to the liquid ejection head 3 flows and is supplied and collected in the following order. The liquid initially flows into the liquid ejection head 3 from the liquid connection portion 111 of the liquid supply unit 220. Then, the liquid is supplied to the rubber joint 100, the common communication port 63 provided in the second flow path member 60, and the common flow path groove 61 and the communication port 51 that are provided in the first flow path member 50, in this order. After that, the liquid is supplied to the pressure chamber 23 via the support member communication port 31 provided in the support member 30, the openings 21 provided in the cover plate 20, and the liquid supply path 18 and the supply port 17*a* provided in the substrate 11, in this order. Liquid that has been supplied to the pressure chamber 23 and has not been ejected from the ejection ports 13 flows to the collecting port 17*b* and the liquid collecting path 19 provided in the substrate 11, the openings 21 provided in the cover plate 20, and the support member communication port 31 provided in the support member 30, in this order. After that, the liquid flows to the communication port 51 and the common flow path groove 62 that are provided in the first flow path member 50, the common communication port 63 provided in the second flow path member 60, and the rubber joint 100 in this order. Then, the liquid flows from the liquid connection portion 111 provided in the liquid supply unit 220, to the outside of the liquid ejection head 3. In the configuration of a circulation pathway that is illustrated in FIG. 3, liquid that has flowed in from the liquid connection portion 111 is supplied to the rubber joint 100 after passing through the negative pressure control unit 230.

Figure 11A:
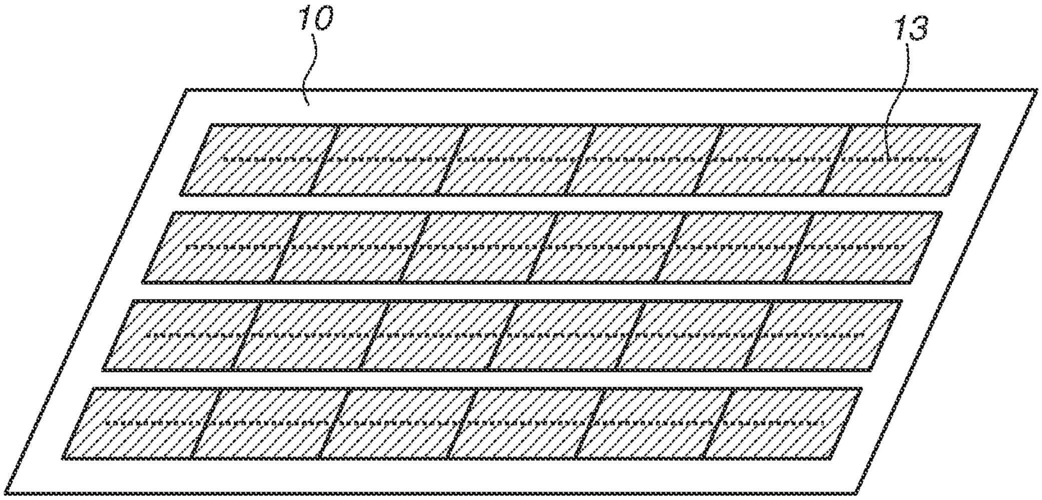
FIGS. 11A and 11B are schematic diagrams illustrating a temperature adjustment unit included in the element substrate according to an exemplary embodiment of the present disclosure.
Figure 11B:
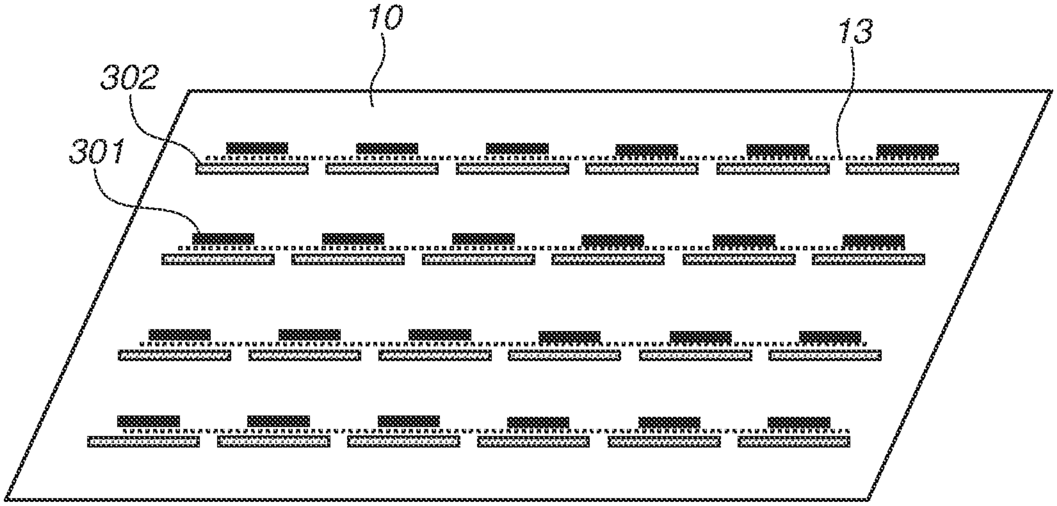

The liquid ejection head 3 according to the present exemplary embodiment further includes a temperature adjustment mechanism in the element substrate 10. FIGS. 11A and 11B are schematic diagrams illustrating a state in which each element substrate 10 is partitioned into a plurality of areas for temperature adjustment. A temperature sensor 301 and an individually-controllable sub heater 302 are provided for each area. The control unit 500 (refer to FIG. 2) performs temperature adjustment based on a temperature (target temperature) set for each area, using the temperature sensor 301 and the sub heater 302. More specifically, the control unit 500 drives the sub heater 302 only in an area in which a detected temperature of the temperature sensor 301 is equal to or smaller than the target temperature. By setting the target temperature of the element substrate 10 to a reasonably high temperature, it becomes possible to decrease the viscosity of ink, and desirably perform an ejection operation and circulation. By performing such temperature control, a temperature variation in the element substrate 10, and a temperature variation among a plurality of element substrates 10 are reduced to a predetermined range. With this configuration, it is possible to reduce a variation in ejection amount that is attributed to a temperature variation, and suppress density unevenness in a recorded image. It is desirable that the target temperature of the element substrate 10 is set to a temperature equal to or larger than a temperature equivalent to an equilibrium temperature of the element substrate 10 that is set in a case where all recording elements 15 are driven at the highest possible frequency. A diode sensor or an aluminum sensor can be applied as the temperature sensor 301. In addition, the energy generation element 15 serving as a heater element can also be used as a heating unit of the element substrate 10. Specifically, it is sufficient that the element substrate 10 is heated by applying voltage to the energy generation element 15 in such a manner that foaming is not caused. For example, in place of the sub heater 302, the energy generation element 15 may be employed as a heating unit, or both the sub heater 302 and the energy generation element 15 may be used.

<Positional Relationship between Element Substrates>

Figure 12:
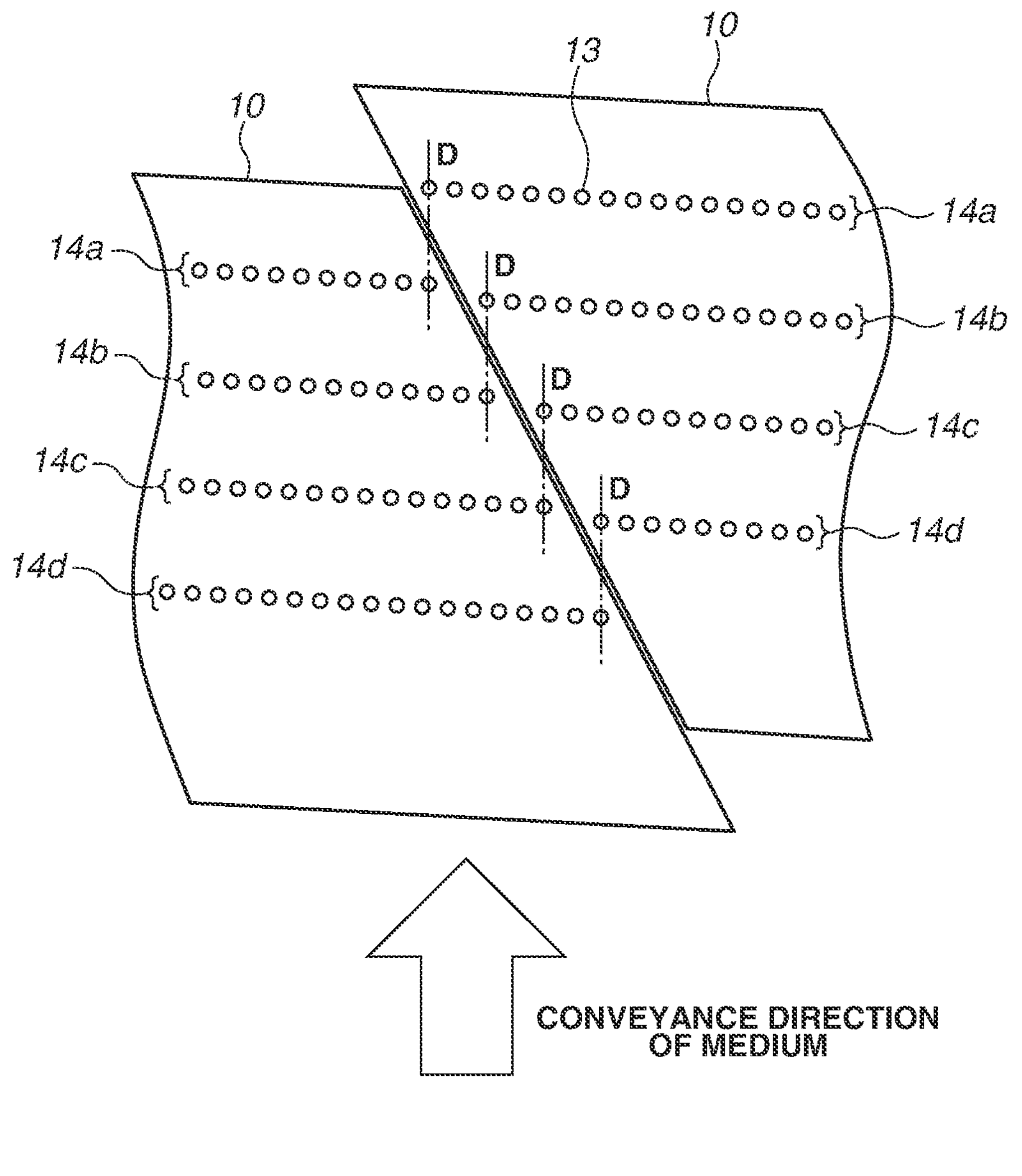
FIG. 12 is a partially-enlarged plan view of a neighboring portion of element substrates according to an exemplary embodiment of the present disclosure.

FIG. 12 is a partially-enlarged plan view illustrating a neighboring portion of element substrates in two neighboring ejection modules. As illustrated in FIGS. 9A to 9C, in the present exemplary embodiment, the element substrate 10 with an substantially-parallelogram external shape is used. As illustrated in FIG. 12, ejection port rows (14*a* to 14*d*) in which the ejection ports 13 are arrayed in each element substrate 10 are arranged with an inclination of a constant angle with respect to a conveyance direction of a medium. With this configuration, in ejection rows at a neighboring portion of the element substrates 10, at least one ejection port overlaps at least one ejection port in the conveyance direction of the medium. In FIG. 12, two ejection ports on a line D are in a mutually-overlapping relationship. With such arrangement, even in a case where the position of the element substrate 10 deviates from a predetermined position to a certain degree, by the drive control of overlapping ejection ports, it is possible to make a black streak and white spot in a recorded image less noticeable. In other words, also in a case where a plurality of element substrates 10 is linearly arranged (in line) instead of staggered arrangement to suppress an increase in the length of the liquid ejection head 3 in the conveyance direction of the medium 2, with the configuration illustrated in FIG. 12, it is possible to take measures against black streak and white spot in a joint portion between element substrates 10, while suppressing an increase in the length of the liquid ejection head 3 in the conveyance direction of the medium 2. In the present exemplary embodiment, a principal plane of the element substrate 10 is a parallelogram, but the present disclosure is not limited to this. For example, also in a case where an element substrate with another shape such as a rectangle or a trapezoid is used, the configuration of the present disclosure can be desirably applied.

<Flow of Liquid in Vicinity of Pressure Chamber>

Figure 13A:
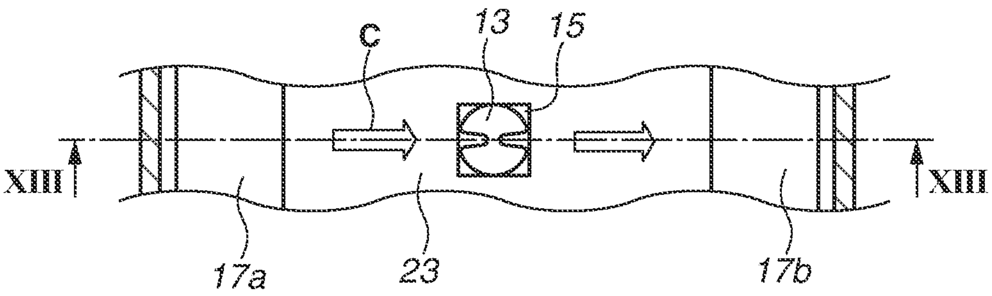
FIG. 13A is a plan view illustrating a main part of the liquid ejection head according to an exemplary embodiment of the present disclosure.
Figure 13B:
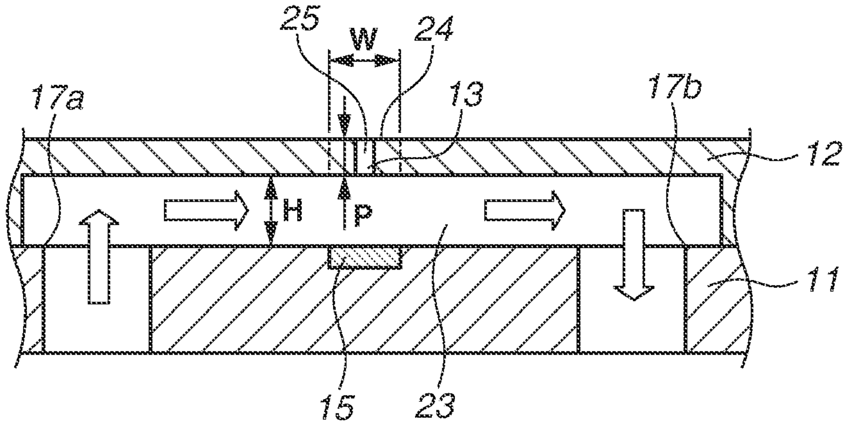
FIG. 13B is a cross-sectional view of the main part.
Figure 13C:
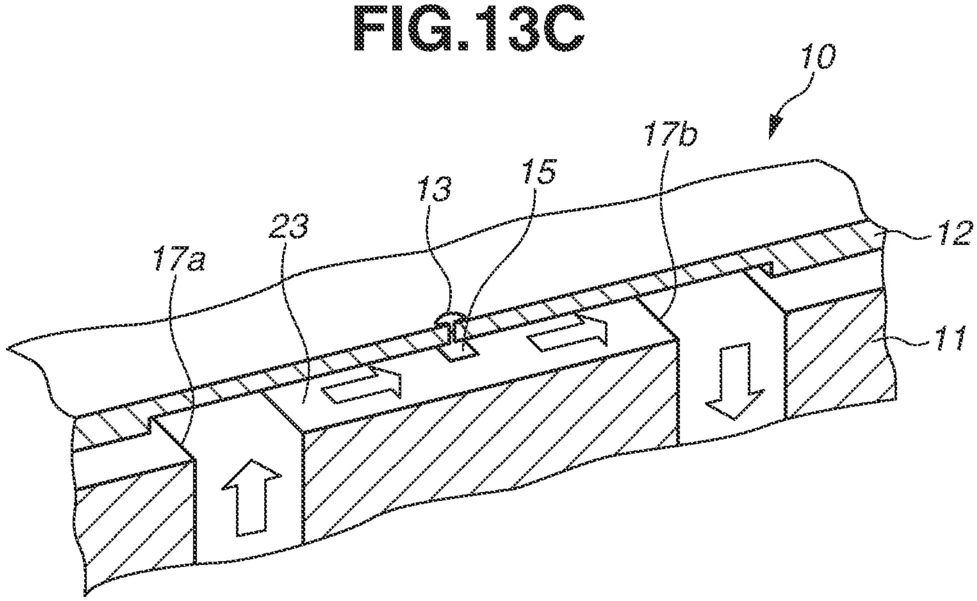
FIG. 13C is a cross-sectional perspective view of the main part.

FIGS. 13A to 13C are schematic diagrams illustrating the vicinity of the ejection port 13 of the element substrate 10 in detail. FIG. 13A is a transparent view viewed from an ejection direction in which liquid is ejected, FIG. 13B is a cross-sectional view taken along a line XIII-XIII in FIG. 13A, and FIG. 13C is a cross-sectional perspective view taken along the line XIII-XIII in FIG. 13A.

In the element substrate 10, in the ejection ports 13 that are not performing an ejection operation, as described above, the circulating flow C in which liquid in the liquid supply path 18 provided in the substrate 11 flows to the liquid collecting path 19 via the supply port 17*a*, the pressure chamber 23 and the collecting port 17*b* is formed. A speed of the circulating flow C in the pressure chamber 23 is desirably set to a speed equal to or larger than 1.0 mm/s and equal to or smaller than 250 mm/s, for example, which is a speed at which influence on droplet landing accuracy is small even if an ejection operation is performed in a state in which liquid flows. At this time, an ejection port interface 24 being a meniscus of liquid (i.e., interface between liquid and air) is formed in the ejection port 13. As illustrated in FIG. 13B, the ejection port 13 is an opening portion that is formed in the ejection port forming member 12, and positioned at an end portion of a cylindrical ejection port portion 25, and the ejection port portion 25 connects the ejection port 13 and the pressure chamber 23. A direction in which liquid is ejected from the ejection port 13 (up-down direction in FIG. 13B) will be referred to as an "ejection direction", and a flow direction of liquid in the pressure chamber 23 (left-right direction in FIG. 13B) will be simply referred to as a "flow direction".

The dimensions of the pressure chamber 23 and the ejection port portion 25 are defined as follows. As illustrated in FIG. 13B, a height of the pressure chamber 23 on the upstream side in the flow direction of a portion communicating with the ejection port portion 25 is defined as H m, a length of the ejection port portion 25 in the ejection direction is defined as P μm, and a length in the flow direction is defined as W μm. The length W is a length of the ejection port 13 in the flow direction that is obtainable in a case where the ejection port 13 does not include a protruding portion 27 (to be described below). As an example of these dimensions, H is equal to or larger than 3 μm and equal to or smaller than 30 am, P is equal to or larger than 3 μm and equal to or smaller than 30 m, and W is equal to or larger than 6 μm and equal to or smaller than 30 μm. The following description will be given of an example case where ink adjusted to have a nonvolatile solvent concentration equal to or larger than 10 wt % and equal to or smaller than 20 wt %, a pigment concentration equal to or larger than 3 wt % and equal to or smaller than 10 wt %, a solid content concentration equal to or larger than 10 wt % and equal to or smaller than 30 wt %, and a viscosity equal to or larger than 0.003 Pa·s and equal to or smaller than 0.006 Pa-s is used as liquid to be ejected. The solid content concentration refers to the concentration of pigment, resin, and wax included in ink.

<Shape of Ejection Port>

Figure 14A:
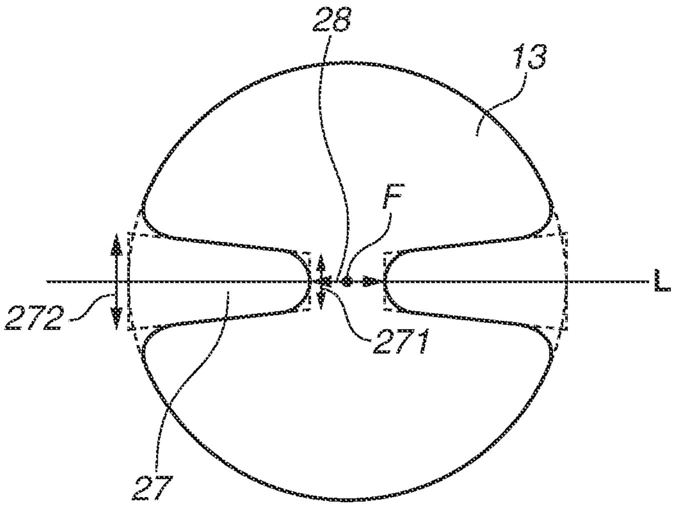
FIGS. 14A and 14B are enlarged plan views of an ejection port of the liquid ejection head according to an exemplary embodiment of the present disclosure.

FIG. 14A is a plan view illustrating the shape of the ejection port 13 according to the present exemplary embodiment. In the present exemplary embodiment, two protruding portions 27 having the same shape are provided on a straight line L passing through a center F of the ejection port 13, on both sides of the center F, in such a manner as to protrude toward the center F. This brings about such an effect that the trail of an ejected liquid droplet becomes shorter. Specifically, a meniscus of ink formed between the protruding portions 27 becomes easily-maintainable as compared with a meniscus of another portion. Thus, the trail of a liquid droplet extending from the ejection port 13 can be cut off at an earlier timing, and the generation of mist being fine liquid droplets to be generated accompanying a main droplet can be suppressed. In FIG. 1 to FIGS. 13A to 13C, the ejection port 13 is illustrated with the protruding portions 27 being omitted. If an interval 28 between the protruding portions 27 becomes wider, the trail of an ejected liquid droplet becomes longer, small satellite droplets are easily generated. It is therefore desirable that the interval 28 is equal to or smaller than 5.0 μm. On the other hand, if the interval 28 becomes too narrow, it becomes difficult to form the protruding portions 27, and an ejected liquid droplet is sometimes separated into two. It is therefore desirable that the interval 28 is equal to or larger than 2.0 μm. In other words, it is desirable that the interval 28 is equal to or larger than 2.0 μm and equal to or smaller than 5.0 μm. In the present exemplary embodiment, the interval 28 is set to 3 μm as an example.

Figure 14B:
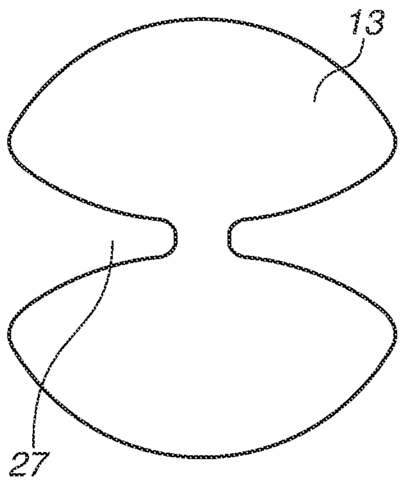

In addition, if the leading end (center F side) of the protruding portion 27 is thick, in some cases, an ejected liquid droplet is separated by the protruding portion 27 into two liquid droplets. It is therefore desirable that a width 271 of a leading end portion of the protruding portion 27 is equal to or smaller than 4 μm. In the present exemplary embodiment, the width 271 is set to 2 μm as an example. In a case where the leading end of the protruding portion 27 is rounded as in the present exemplary embodiment illustrated in FIG. 14A, as indicated by a dotted line in FIG. 14A, a length of a line segment obtained by separating a line orthogonal to the straight line L at the leading end of the protruding portion 27, at leading end intersections with two lines extending from two long sides of the protruding portion 27 can be considered to be the width 271 of the leading end portion. In addition, to enhance the strength of the protruding portion 27, it is desirable that a width 272 of a root portion of the protruding portion 27 is formed to be thicker than the width 271 of the leading end portion. In the present exemplary embodiment, the width 272 is set to 4 μm as an example. In a case where the shape of the ejection port 13 at the root portion is a curved shape as in the present exemplary embodiment illustrated in FIG. 14A, as indicated by a dotted line in FIG. 14A, a length of a line segment separated by two intersections between two lines extending from two long sides of the protruding portion 27, and an outer circumferential line obtainable in a case where the ejection port 13 is circle can be considered to be the width 272 of the root portion. In this manner, from the aspect of liquid droplet formation, a shape of the protruding portion 27 is desirably a shape with a width thinning from the root portion toward the leading end portion, and as illustrated in FIG. 14B, the protruding portion 27 may have a shape including an arc.

It is desirable that the above-described two protruding portions 27 extend in a direction substantially parallel to the conveyance direction of the medium 2 (the X direction). Because the protruding portions 27 influence the ejection of liquid droplets extremely greatly, when a slight manufacturing variation is generated in the shapes of the two protruding portions 27, a liquid droplet spatters with a deviation in a direction of one protruding portion, and a droplet landing position deviation is generated. Generally, a droplet landing position deviation in the ejection port row direction (the Y direction) becomes more visible on an image than a droplet landing position deviation in the medium conveyance direction (the X direction). Thus, by setting the direction of the protrusion to a direction substantially parallel to the conveyance direction of the medium 2, it is possible to suppress a deviation in the ejection port row direction, and an effect of keeping good printing can be obtained.

In the present exemplary embodiment, the two protruding portions 27 extend toward the center F of the ejection port 13, but even if the number of the protruding portions 27 is one, liquid droplet formation is kept in a good state. Nevertheless, in this case, a droplet landing position greatly deviates toward a direction in which the protruding portion 27 is not provided, and the stability of the droplet landing position sometimes deteriorates. It is therefore desirable that the two protruding portions 27 extend in the direction of the ejection port center F.

Furthermore, to achieve good image quality with stable ejection quality, a landing dot size of a liquid droplet on the medium 2 is desired to be relatively small and high resolution. Thus, in the liquid ejection head 3 according to the present exemplary embodiment, an ejection volume is set to a relatively small volume of 2.0 ng.

<Description of Flow of Liquid in Ejection Port Portion>

Figure 15:
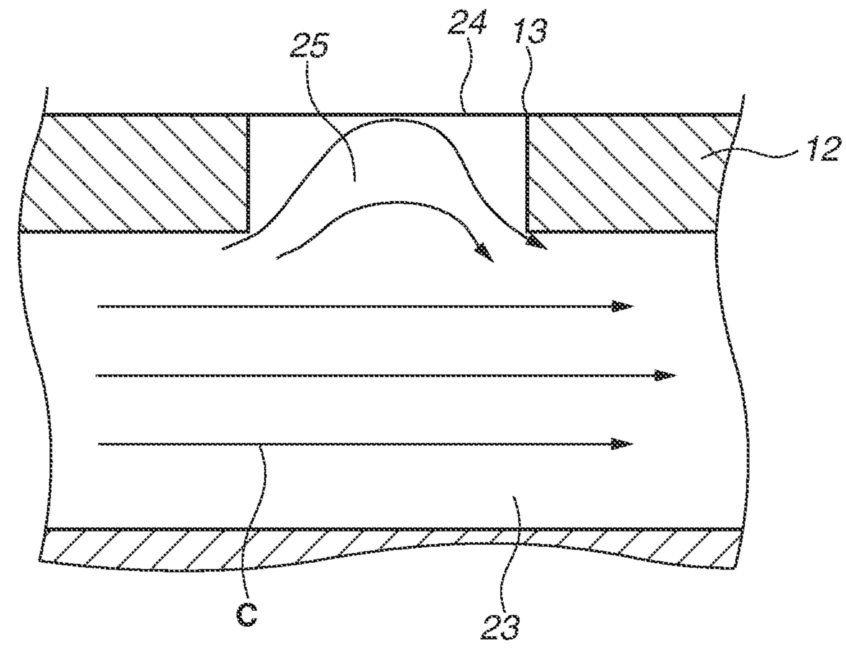
FIG. 15 is enlarged cross-sectional view illustrating the vicinity of the ejection port of the liquid ejection head according to an exemplary embodiment of the present disclosure.

FIG. 15 is an enlarged cross-sectional view illustrating the vicinity of the ejection port 13, and illustrates the state of the circulating flow C in the ejection port 13, the ejection port portion 25, and the pressure chamber 23 when the circulating flow C is in a steady state.

Specifically, the state of a flow of ink with a flow amount of 1.26×10 μml/min flowing into the pressure chamber 23 from the supply port 17*a* in the element substrate 10 having the above-described dimensions (H: 14 μm, P: 5 μm, W: 12.4 μm) is indicated by arrows. To simplify the drawing, the illustration of the protruding portion 27 is omitted. In FIG. 15, the length of an arrow does not indicate the magnitude of speed.

Due to ink evaporation from the ejection port 13, a color material density of ink changes. In the element substrate 10 of the present disclosure, the dimensions of H, P, and W are selected in such a manner as to prevent such ink from being accumulated in the ejection port 13 and the ejection port portion 25. With this configuration, as illustrated in FIG. 15, a part of the circulating flow C in the pressure chamber 23 flows into the ejection port portion 25, and reaches a meniscus position (meniscus interface vicinity) formed in the ejection port 13, and then, returns again to the pressure chamber 23 from the ejection port portion 25. Not only ink near the ejection port portion 25 that is susceptible to evaporation, but also ink near the ejection port interface 24 influenced especially greatly by evaporation flows to the pressure chamber 23 without being accumulated inside the ejection port portion 25. Here, the circulating flow C is characterized in that the circulating flow C has a speed component (hereinafter, "positive speed component") in the flow direction (left-to-right direction in FIG. 13B) in at least the vicinity of a center portion of the ejection port interface 24 (center portion of ejection port).

Hereinafter, a mode of a flow in which the circulating flow C has a positive speed component in at least the vicinity of the center portion of the ejection port interface 24 as illustrated in FIG. 15 will be referred to as a "flow mode A". As described below, a mode of a flow having a negative speed component (right-to-left direction in FIG. 13B) opposite to the positive speed component in the center portion vicinity of the ejection port interface 24 will be referred to as a "flow mode B".

The inventors of the present disclosure have discovered that, in the liquid ejection head 3, whether the circulating flow C operates in the flow mode A or the flow mode B is determined in accordance with the above-described dimensions H, P, and W of the pressure chamber 23 and the ejection port portion 25. In other words, in the liquid ejection head 3 operating in the flow mode A, the height H on the upstream side in the flow direction of the pressure chamber 23, the length P in the ejection direction of the ejection port portion 25, and the length W (refer to FIG. 13B) in the flow direction satisfy the following relationship.

$$H^{-0.34} \times P^{-0.66} \times W > 17 \tag{1}$$

Accordingly, in the liquid ejection head 3 satisfying the relationship represented by Inequation (1), the flow mode A as illustrated in FIG. 15 is implemented, and in the liquid ejection head 3 not satisfying the relationship represented by Inequation (1), the flow mode B is implemented. A left-hand side of Inequation (1) will be referred to as a determination value J.

Figure 16:
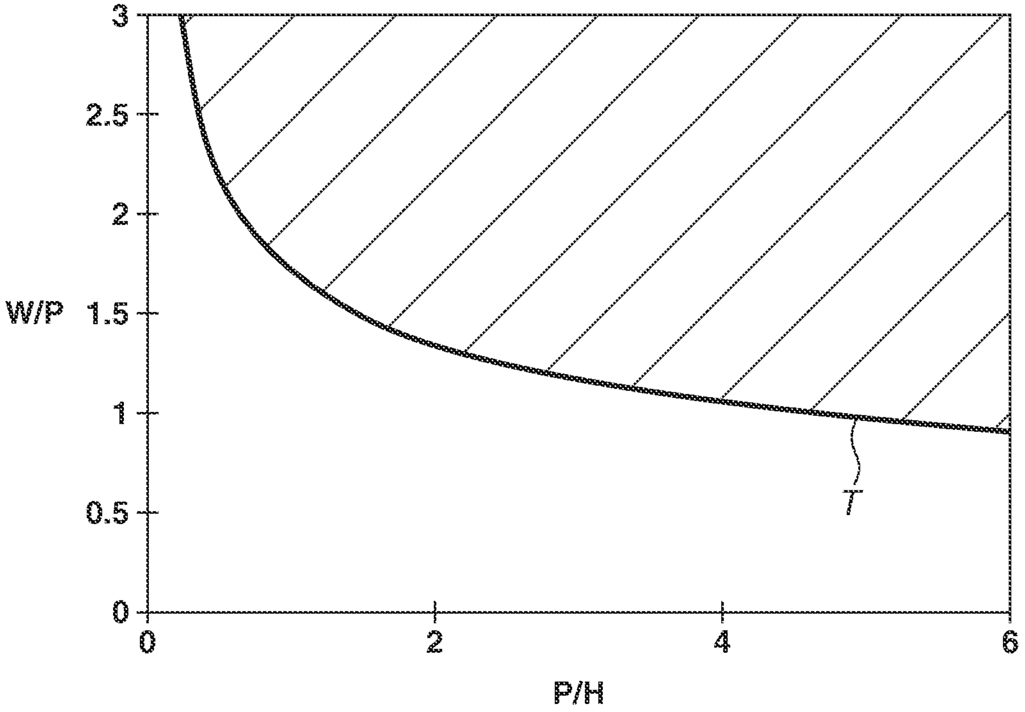
FIG. 16 illustrates a graph indicating a relationship between a head dimension and a flow mode.

FIG. 16 illustrates a graph indicating a relationship between each dimension and a flow mode of the liquid ejection head 3. A horizontal axis indicates a ratio of P and H (P/H), and a vertical axis indicates a ratio of W and P (W/P). A thick line T in FIG. 16 is a threshold line, and is a line satisfying the following relationship.

$$\left(\frac{W}{P}\right) = 1.7 \times \left(\frac{P}{H}\right)^{-0.34} \tag{2}$$

In FIG. 16, in the liquid ejection head 3 having the relationship between H, P, and W that falls within an area above the threshold line T (shaded region), the flow mode A is implemented, and in the liquid ejection head 3 having the relationship between H, P, and W that falls within an area below the threshold line T, the flow mode B is implemented. In other words, in the liquid ejection head 3 satisfying the following relationship, the flow mode A is implemented.

$$\left(\frac{W}{P}\right) > 1.7 \times \left(\frac{P}{H}\right)^{-0.34} \tag{3}$$

Because Inequation (1) is obtained by organizing Equation (3), in the liquid ejection head 3 having the relationship between H, P, and W that satisfies Inequation (1) (the liquid ejection head 3 with the determination value J equal to or larger than 1.7), the flow mode A is implemented.

On the other hand, in the liquid ejection head 3 having the relationship between H, P, and W that satisfies the following relationship, the flow mode B is implemented.

$$H^{-0.34} \times P^{-0.66} \times W \leq 1.7 \tag{4}$$

In this manner, by using the threshold line T in FIG. 16 as a borderline, it is possible to distinguish between the liquid ejection head 3 operating in the flow mode A, and the liquid ejection head 3 operating in the flow mode B. That is, in the liquid ejection head 3 having the determination value J larger than 1.7 in Inequation (1), the flow mode A is implemented, and the circulating flow C has a positive speed component in at least the vicinity of the center portion of the ejection port interface 24.

The conditions of the above-described dimensions H, P, and W have a dominant influence on whether the circulating flow C in the ejection port portion 25 operates in the flow mode A or operates in the flow mode B. An influence to be exerted by conditions other than these, such as a flow rate of the circulating flow C, the viscosity of ink, and a width of the ejection port 13 (a length in a direction orthogonal to the flow direction), for example, is extremely smaller as compared with the conditions of the dimensions H, P, and W. Accordingly, a circulating flow rate and the viscosity of ink can be appropriately set in accordance with a required specification of the liquid ejection head 3 (liquid ejection apparatus) and a usage environment condition. For example, ink with a flow rate of the circulating flow C in the pressure chamber 23 that is equal to or larger than 1.0 mm/s and equal to or smaller than 250 mm/s, and viscosity equal to or smaller than 0.01 Pa-s can be used. In the liquid ejection head 3 operating in the flow mode A, in a case where an evaporation amount of ink from an ejection port increases due to a usage environment change, the flow mode A can be maintained by appropriately increasing a flow amount of the circulating flow C. On the other hand, in the liquid ejection head 3 of which the dimensions are set in such a manner that the flow mode B is implemented, even if a flow amount of the circulating flow C is increased, the flow mode A is not implemented. Among the liquid ejection head 3 operating in the flow mode A, the liquid ejection head 3 having H equal to or smaller than 20 μm, P equal to or smaller than 20 m, and W equal to or smaller than 30 μm is especially desirable. With this configuration, higher-definition image formation becomes executable.

Because a speed component of the circulating flow C in the center portion vicinity of the ejection port interface 24 varies between the liquid ejection head 3 operating in the flow mode A and the liquid ejection head 3 operating in the flow mode B, a state of color material density of ink in the ejection port portion 25 also varies. In the liquid ejection head 3 operating in the flow mode A, as compared with the liquid ejection head 3 operating in the flow mode B, a color material density of ink in the ejection port portion 25 becomes relatively lower. This is because, in the liquid ejection head 3 operating in the flow mode A, by the circulating flow C with a positive speed component reaching the vicinity of the ejection port interface 24, ink in the ejection port portion 25 is moved (flowed) up to the pressure chamber 23. With this configuration, in the liquid ejection head 3 operating in the flow mode A, it is possible to prevent ink in the ejection port portion 25 from being accumulated, and it becomes possible to reduce an increase in color material density. Thus, in the liquid ejection head 3 of the present disclosure, the dimensions H, P, and W are determined in such a manner that the flow mode A is implemented.

<Viscosity Increase of Liquid to be Ejected and Viscosity Distribution in Ejection Port Portion>

A viscosity increase of liquid to be ejected in the ejection port portion 25 will be described. As described above, the element substrate 10 is heated in such a manner as to keep a constant temperature, for a ink viscosity decrease in the substrate and temperature distribution difference reduction. In the present exemplary embodiment, the element substrate 10 is subjected to heating control to keep an approximately constant temperature of about 40° C. as an example. An optimum controlled temperature varies depending on ink viscosity and a temperature distribution, and the element substrate 10 is subjected to temperature control to keep a constant temperature of about 35° C. to 70° C.

Figure 17A:
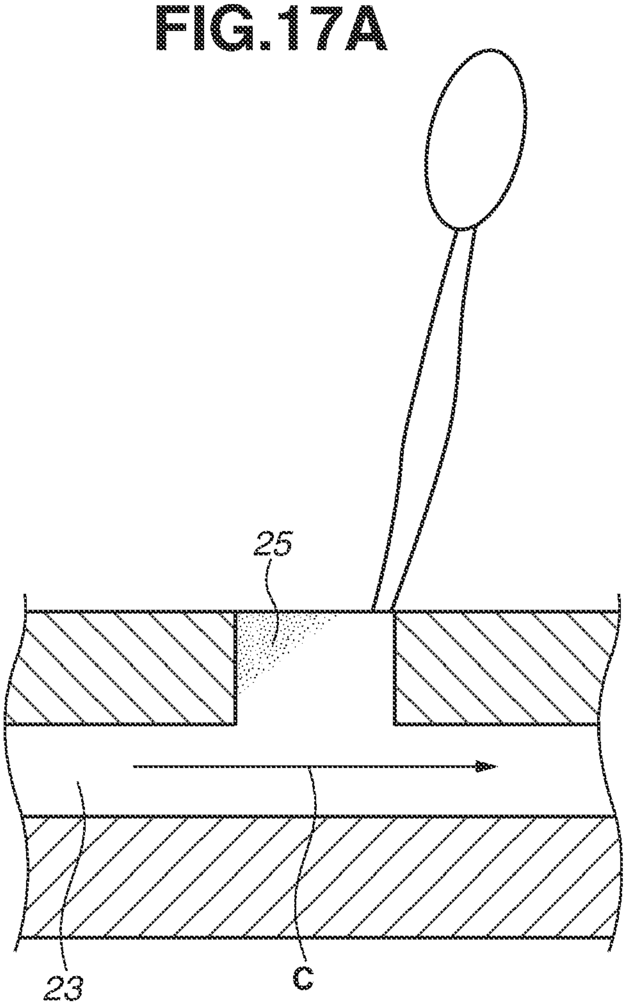
FIGS. 17A and 17B are diagrams illustrating a deviation of an ejection direction of liquid in a flow mode A.
Figure 17B:
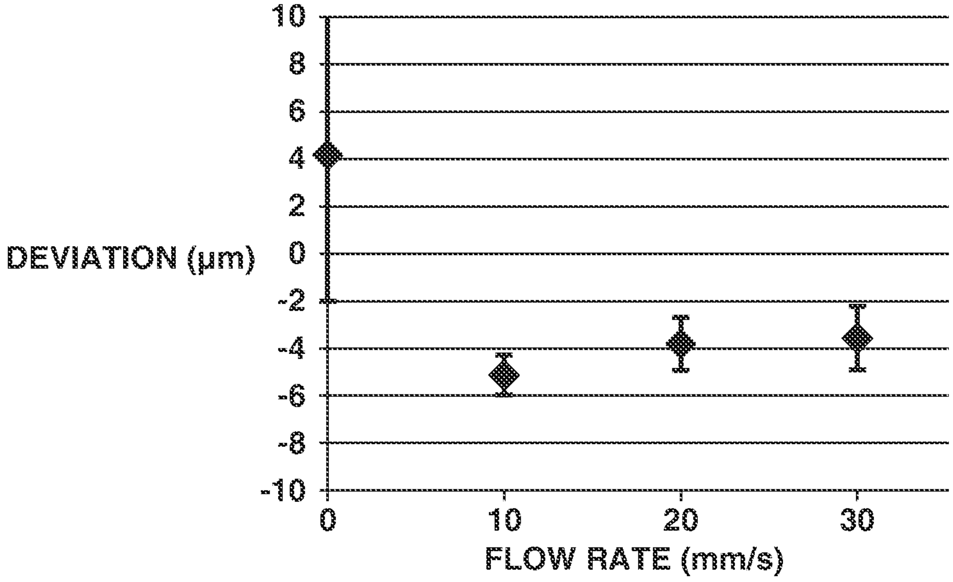

Because the ejection port 13 is exposed to air, water evaporates from the ejection port 13, and ink density in the ejection port portion 25 changes. Particularly in a case where the temperature of the element substrate 10 is controlled as described above, water evaporation becomes prominent and ejection performance is influenced more. Particularly in a case where ink with high solid content concentration is used as in the present exemplary embodiment, design is performed in such a manner as to achieve toughness of a printed article by evaporating water on a medium, and agglutinating pigment, and a degree to which ejection is influence by water evaporation in the ejection port portion 25 is large. In the present exemplary embodiment, because the circulating flow C in the flow mode A is generated in the ejection port portion 25, ink with density increased by water evaporation is discharged to the downstream, increases in pigment and solid content concentrations in the entire ejection port portion 25 are suppressed to some extent. Thus, a phenomenon in which a liquid droplet is not ejected from the ejection port 13 does not occur. Nevertheless, also in the case of the present exemplary embodiment, as illustrated in FIGS. 17A and 17B, in a corner portion on the upstream side which the circulating flow C gets into, a flow is easily accumulated, and thickening occurs on the upstream side of an ink flow in the ejection port portion 25. In particular, because the ejection port 13 of the present disclosure includes the protruding portion 27 along the flow direction of liquid in the vicinity of the pressure chamber 23, thickening easily occurs in the vicinity of the root of the protruding portion 27 on the upstream side of the ink flow.

<Deviation in Ejection Direction of First Liquid Droplet after Intermission>

As described above, in the liquid ejection head 3 of the present exemplary embodiment, imbalance is created in color material density and liquid viscosity in the ejection port portion 25, and due to the imbalance, a deviation from a target direction sometimes occurs in the ejection direction of liquid. Because a predetermined amount of time is required until a density distribution and a viscosity distribution in the ejection port portion 25 are formed, the deviation of the ejection direction does not occur in a case where liquid is consecutively ejected, and the deviation occurs in the case of the first liquid droplet ejected after intermission of a predetermined amount of time.

In a case where the arrangement of the protruding portion 27 is substantially parallel to the conveyance direction of the medium 2 and a flow of the circulating flow C is also parallel thereto as in the liquid ejection head 3 according to the present disclosure, a droplet landing position deviates in the conveyance direction of the medium 2. The landing position deviation influences image quality as described above. Particularly in a case where the size (volume) of an ejected liquid droplet is reduced for high-definition printing as in the present exemplary embodiment, an influence on viscosity increase becomes larger.

FIG. 17A is a diagram illustrating a state of a deviation of the ejection direction in the liquid ejection head 3 that operates in the flow mode A, according to the present exemplary embodiment. FIG. 17B illustrates a graph in which average values of deviations from the target droplet landing position that are obtainable when a flow rate of the circulating flow C is changed are plotted. Because a point with relatively-high viscosity exists on the upstream side of the circulating flow C in the ejection port portion 25, the ejection direction of liquid sometimes deviates toward the downstream side in the direction of the circulating flow C, as compared with a case where liquid is consecutively ejected, as illustrated in FIG. 17A. This deviation is about 5 μm, for example, as illustrated in FIG. 17B.

<Liquid Ejection Head Configuration that Considers Deviation of Liquid Ejection Direction>

Figure 18A:
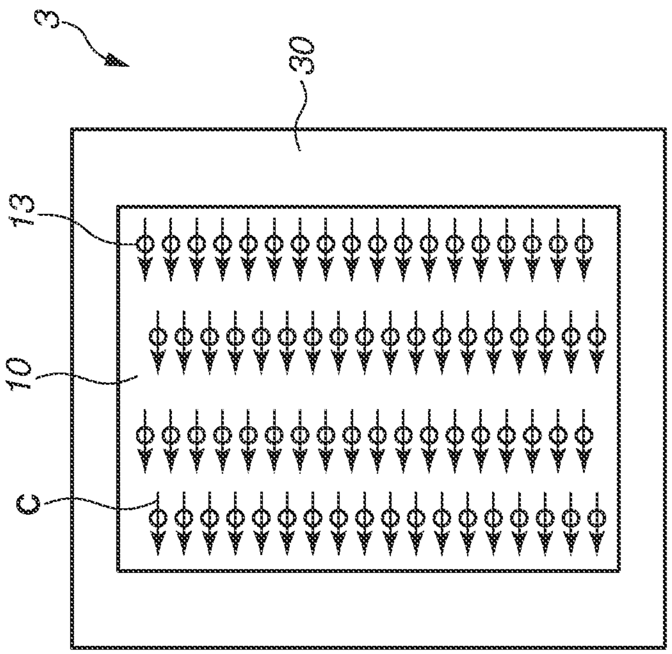
FIGS. 18A and 18B are plan views illustrating a configuration example of a liquid ejection head that considers a deviation of an ejection direction.
Figure 18B:
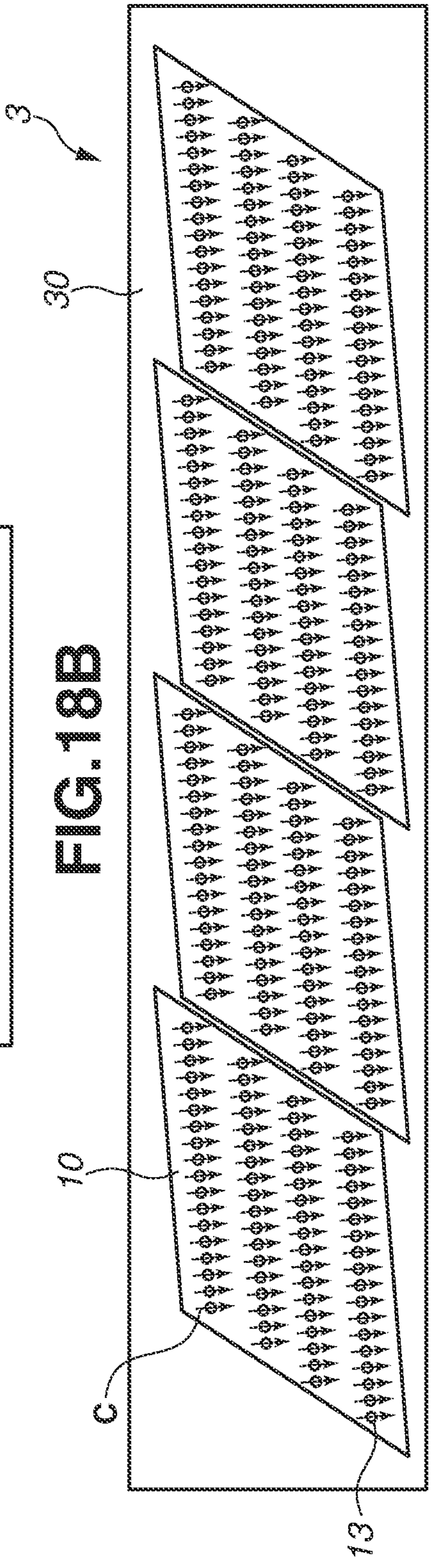

FIG. 18A is a plan view illustrating a configuration example of the liquid ejection head 3 formed considering the above-described deviation of the liquid ejection direction, and FIG. 18B is a plan view illustrating another configuration example. In FIGS. 18A and 18B, directions of the circulating flow C in the pressure chamber 23 that correspond to the respective ejection ports 13 are indicated by arrows. In this manner, by setting the directions of the circulating flows C to the same direction in all ejection ports 13 of the liquid ejection head 3, it is possible to uniformize deviations of the ejection direction of liquid droplets to be first ejected after intermission. Accordingly, even if ejection directions of liquid droplets to be first ejected after intermission deviate, higher-quality ruled lines can be formed, and higher-definition and higher-quality image formation becomes executable, when ruled lines are to be printed, for example, because deviation directions in the respective ejection ports are the same direction.

Figure 19A:
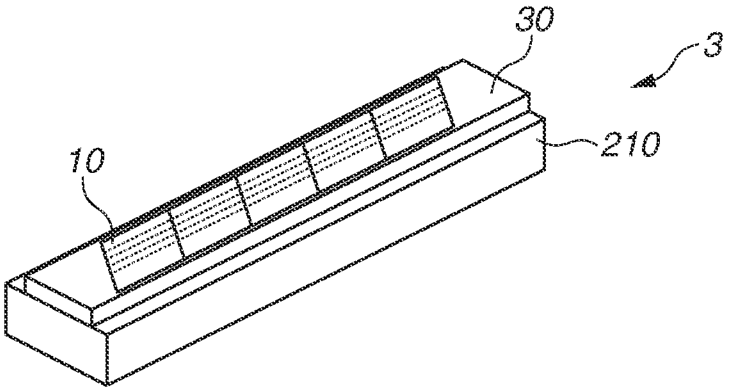
FIGS. 19A to 19D are plan views illustrating a configuration example of a liquid ejection head including a plurality of element substrates.
Figure 19B:
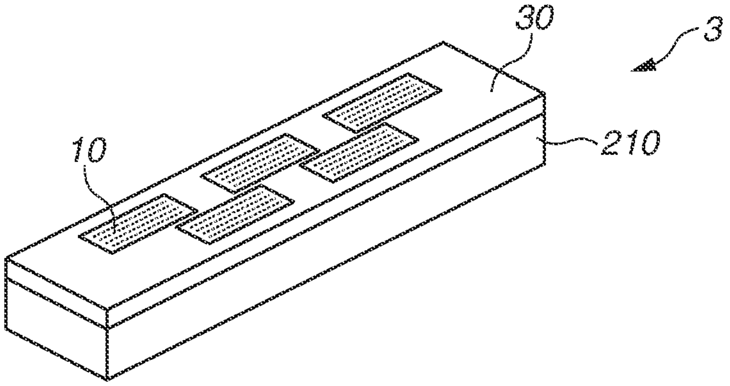
Figure 19C:
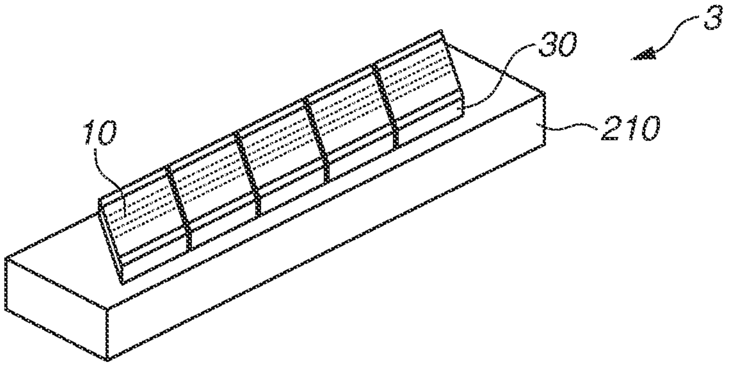
Figure 19D:
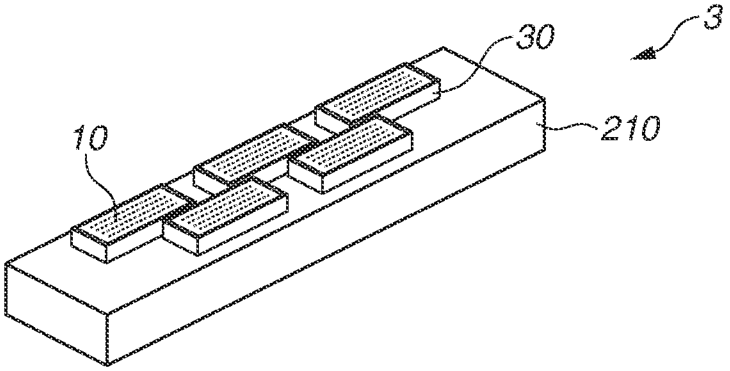

The configuration of the liquid ejection head 3 is not limited to the example of an in-line array illustrated in FIGS. 18A and 18B, and various configurations can be employed. FIG. 19A is a diagram corresponding to FIG. 18B. In contrast to such a configuration example in which a plurality of element substrates 10 is linearly arranged, a plurality of element substrates 10 can also be arranged in a staggered manner, as illustrated in FIG. 19B. In contrast to a configuration example in which a plurality of element substrates 10 is provided on one support member 30 as illustrated in FIGS. 19A and 19B, the respective element substrates 10 may be individually provided on plurality of support members 30 as illustrated in FIGS. 19C and 19D. As described above, the shape of the principal plane of the element substrate 10 may be a parallelogram illustrated in FIGS. 19A and 19C, or may be a rectangle illustrated in FIGS. 19B and 19D. Also in all the configuration examples illustrated in FIGS. 19A to 19D, directions of the circulating flow C corresponding to all ejection ports 13 of the liquid ejection head 3 are the same.

<Decrease in Ejection Speed of First Liquid Droplet after Intermission>

Figure 20:
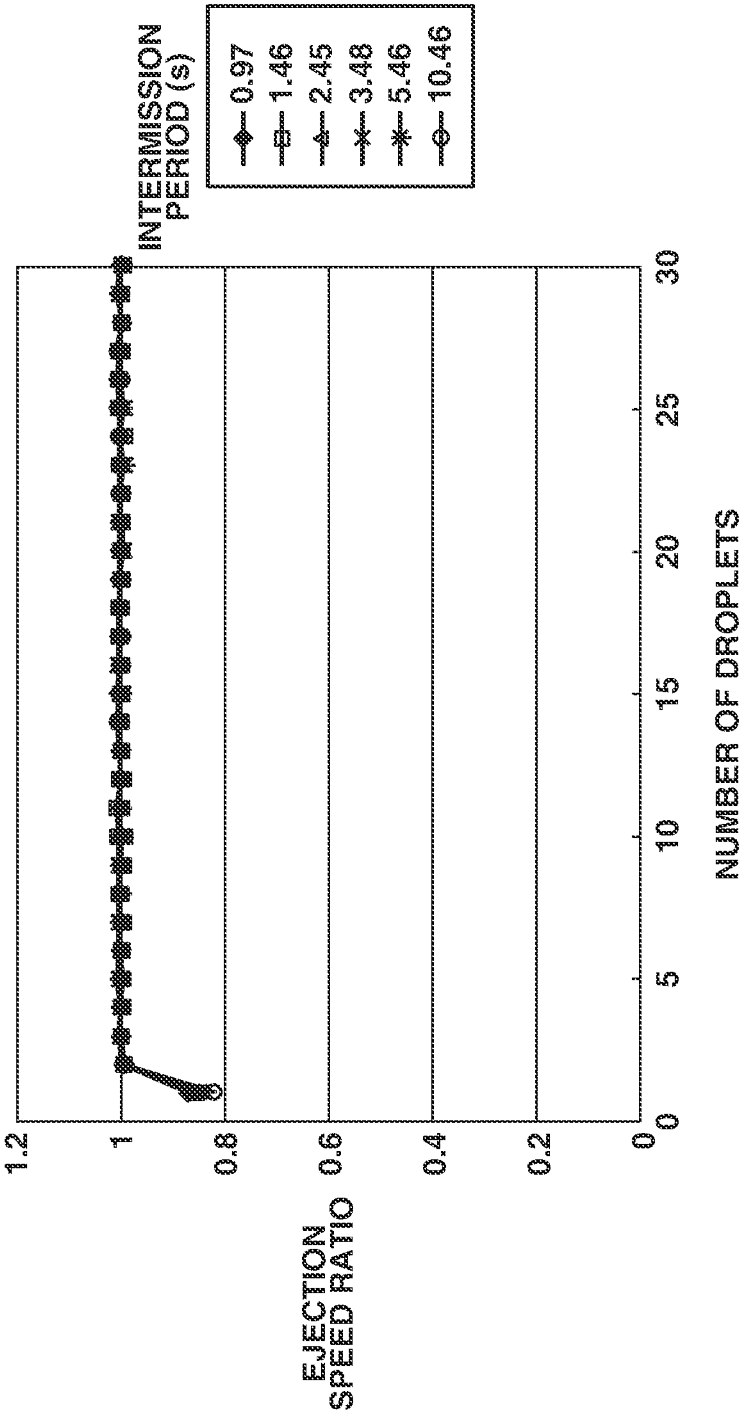
FIG. 20 illustrates a graph in which ejection speeds with respect to the numbers of droplets ejected after intermissions are plotted.

FIG. 20 is a graph in which ejection speeds with respect to the numbers of droplets ejected after intermissions provided when an intermission period of an ejection operation is changed to various intermission periods in the liquid ejection head 3 of the present exemplary embodiment that operates in the flow mode A are plotted. On a vertical axis, a ratio obtained when an average value of ejection speeds of tenth to 30th liquid droplet ejected after intermission is assumed to be 1 is plotted. As clearly seen from FIG. 20, from second and subsequent liquid droplets ejected after intermission, ejection speeds become ejection speeds substantially equal to an ejection speed obtained in a case where liquid is consecutively ejected, but in the ejection of a first liquid droplet ejected after intermission, an ejection speed becomes slightly slower. This is because the viscosity of liquid in the ejection port portion 25 becomes larger than that in the pressure chamber 23 to a certain degree by intermitting an ejection operation as described above. In other words, because a predetermined amount of time is required until a color material density (liquid viscosity) in the ejection port portion 25 increases, similarly to the above-described deviation of the ejection direction, a decrease in ejection speed is a phenomenon that does not occur in a case where liquid is consecutively ejected, and occurs in a case where a first liquid droplet is ejected after an intermission of a predetermined amount of time.

<Liquid Ejection Head Configuration that Considers Relative Moving Direction of Medium>

Because an ejection speed of a first liquid droplet to be ejected after intermission decreases as compared with a case where liquid is consecutively ejected, the landing position of a liquid droplet on a medium deviates from a target droplet landing position. This actual droplet landing position always deviates toward the upstream side of the target position in a relative moving direction of the medium with respect to the liquid ejection head 3 (hereinafter, will be simply referred to as a "moving direction").

The landing position of the first liquid droplet to be ejected after intermission deviates also by liquid in the ejection port portion 25 thickening and the ejection direction of liquid deviating. As described above, the ejection direction deviates toward the downstream side of the circulating flow C.

By setting the moving direction of the medium and the flow direction of the circulating flow C to the same direction, in the first liquid droplet ejected after intermission, it becomes possible to substantially cancel out a deviation of a droplet landing position that is caused by an ejection speed decrease, and a deviation of the ejection direction that is caused by liquid thickening.

Figure 21:
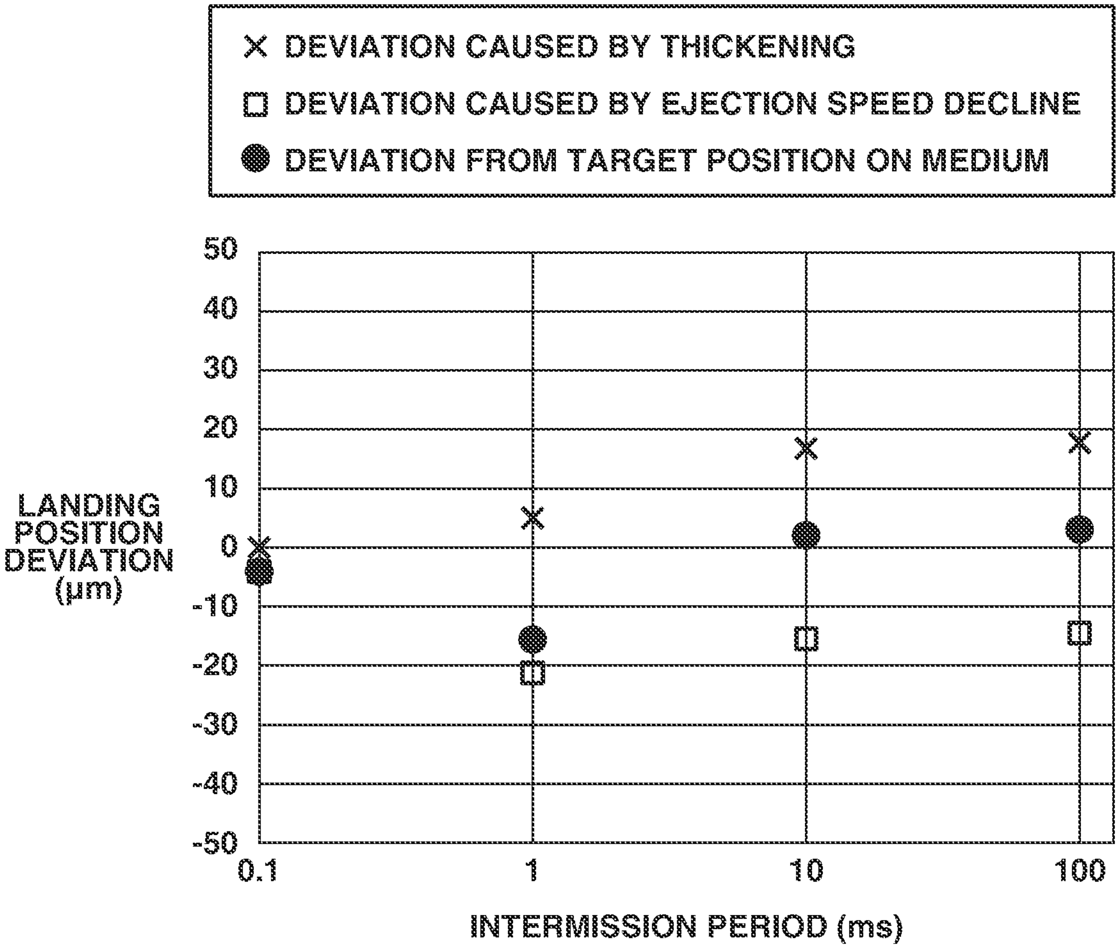
FIG. 21 illustrates a graph in which landing position deviation amounts with respect to intermission periods are plotted.

FIG. 21 is a graph indicating a landing position deviation amount with respect to an intermission period that is obtainable when the moving direction of the medium 2 and the direction of the circulating flow C are set to same direction. As illustrated in FIG. 21, in a case where an intermission period is long, a deviation caused by an ejection speed decrease, and a deviation of the ejection direction of a liquid droplet to be first ejected after intermission are cancelled out.

To successfully cancel out two deviations, it is desirable that a moving speed of the medium 2 is equal to or larger than 0.1 m/s and equal to or smaller than 3.0 m/s, and it is more desirable that a moving speed of the medium 2 is equal to or larger than 0.1 m/s and equal to or smaller than 1.5 m/s.

Figure 22A:
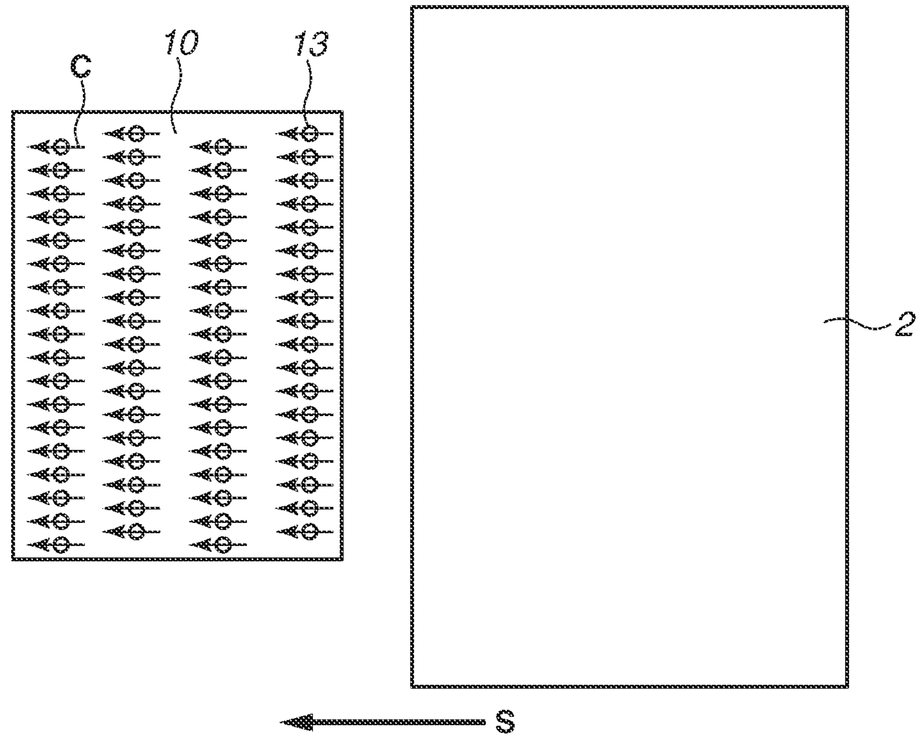
FIGS. 22A and 22B are diagrams illustrating a relationship between a circulating flow and a medium in the flow mode A.
Figure 22B:
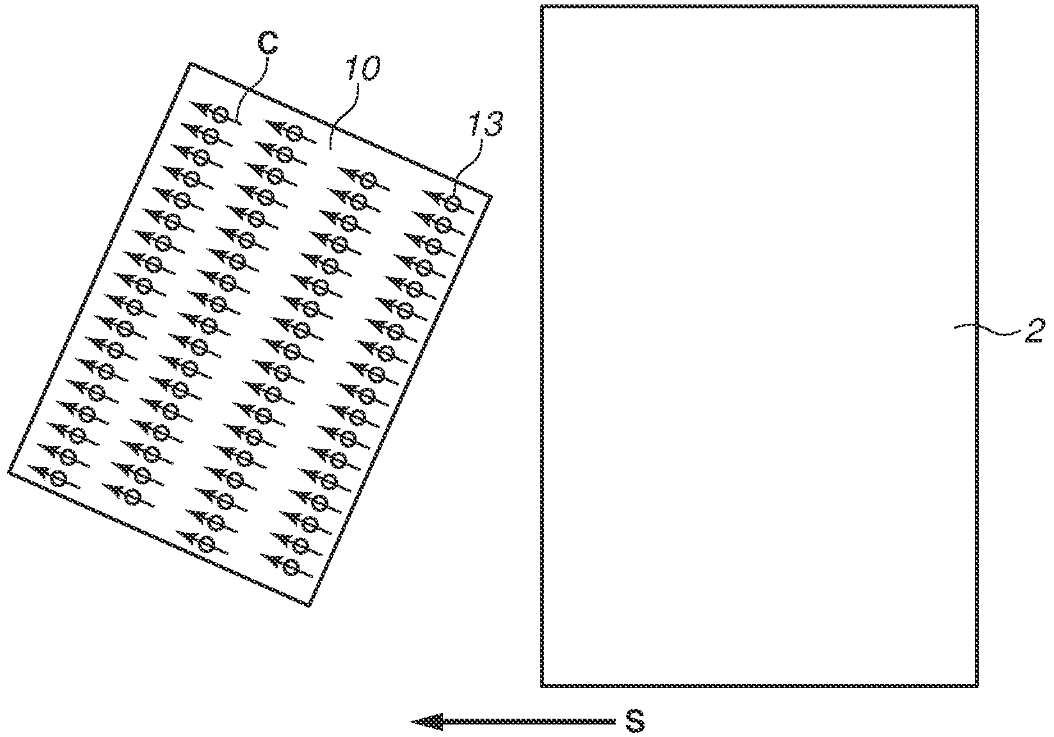

FIGS. 22A and 22B are diagrams illustrating a relationship between a direction of the circulating flow C in the pressure chamber 23, and a relative moving direction of the liquid ejection head 3 and the medium 2. As illustrated in FIGS. 22A and 22B, the direction of the circulating flow C in the pressure chamber 23 and a conveyance direction S of the medium 2 are set to the same direction. The same direction does not always refer to the identical direction illustrated in FIG. 22A, and refers to having a component of the same direction as a component of a moving direction S when a vector of the circulating flow C is resolved into the moving direction S of the medium 2 as illustrated in FIG. 22B. Nevertheless, as an angle formed by the direction of the circulating flow C and the moving direction of the medium 2 becomes larger, a landing position deviation in the moving direction and a landing position deviation in a direction vertical to the moving direction both become larger. It is therefore desirable that an angle formed by the direction of the circulating flow C and the moving direction of the medium 2 is equal to or smaller than 45 degrees.

In the liquid ejection head 3 illustrated in FIGS. 22A and 22B, due to an ejection speed decrease of a liquid droplet to be first ejected after intermission, a droplet landing position deviates toward the upstream side in the moving direction S. On the other hand, by thickening within an ejection port portion of a liquid droplet first ejected after intermission, the ejection direction deviates toward the downstream side of the circulating flow C, and a deviation of a droplet landing position that is caused by this deviation becomes a downstream side in the moving direction S. Accordingly, because a deviation of a droplet landing position that is attributed to an ejection speed decrease, and a deviation of a droplet landing position that is attributed to a deviation of the ejection direction are cancelled out, also in the ejection of a first liquid droplet after intermission, it becomes possible to land ink in the vicinity of a target droplet landing position.

As described above, by setting the flow direction of liquid and a moving direction of the medium to the same direction, it becomes possible to form a higher-definition and higher-quality image by reducing a fluctuation in droplet landing position that occurs in the ejection of a first liquid droplet after intermission, and that is attributed to a change in ejection speed and a fluctuation in ejection direction.

The present disclosure is effective particularly for a liquid ejection head configured to perform temperature adjustment of the substrate 11. By performing temperature adjustment of the substrate 11, while it is possible to suppress a change in ejection speed and a change in ejection amount that occur due to a temperature change of the substrate 11, if the temperature of liquid increases, an amount of liquid evaporation from the ejection port 13 increases, and a density distribution in the ejection port portion 25 becomes larger. Consequently, a deviation of the ejection direction and an ejection speed decrease of a liquid droplet to be first ejected after intermission both become larger in some cases. Nevertheless, by setting the moving direction of the medium in accordance with a flow direction of the circulating flow C in the pressure chamber vicinity and the ejection port portion, it becomes possible to cancel out a fluctuation in droplet landing position that is attributed to a deviation of the ejection direction and a fluctuation in droplet landing position that is attributed to an ejection speed decrease.

In addition, the present disclosure can also be applied to a serial type liquid ejection head in which an ejection port row extends in a direction substantially orthogonal to the conveyance direction of the medium. In this case, it is sufficient that the liquid ejection head and the liquid ejection apparatus are formed in such a manner that the direction of the circulating flow C is reversed in accordance with a scan direction of the liquid ejection head. As a method of reversing the direction of the circulating flow C, there are a method of reversing a pressure difference between two tanks, and a method of reversing the rotation of a pump.

According to the present disclosure, it is possible to provide a liquid ejection head that can perform higher-definition and higher-quality liquid ejection.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-016815, filed Feb. 7, 2023, which is hereby incorporated by reference herein in its entirety.

What is claimed is:

1. A liquid ejection head comprising:

an element substrate provided with an ejection port row in which a plurality of ejection ports configured to eject liquid is arrayed, wherein the element substrate includes an energy generation element configured to generate energy to eject liquid, and a pressure chamber including the energy generation element thereinside, and wherein the ejection port includes a protruding portion protruding toward a center of the ejection port;

a liquid supply path configured to supply liquid to the pressure chamber; and a liquid collecting path configured to collect liquid from the pressure chamber, wherein a direction in which the protruding portion protrudes is substantially parallel to a flow direction of liquid in the pressure chamber that flows from the liquid supply path to the liquid collecting path via the pressure chamber, wherein the flow direction is a same direction in a plurality of the pressure chambers, wherein a height H μm of the pressure chamber on an upstream side in the flow direction of the liquid of a portion communicating with an ejection port portion, a length P μm in an ejection direction of liquid of the ejection port portion, and a length W μm in the flow direction of the liquid of the ejection port portion satisfy a relationship of:

$$H^{-0.34} \times P^{-0.66} \times W > 1.7,$$

wherein the flow direction of the liquid is a same direction as a relative moving direction of a medium that receives liquid ejected from the liquid ejection head in liquid ejection, wherein the element substrate includes an ejection port forming member including the ejection port, and a substrate including the energy generation element, and wherein the substrate includes a temperature adjustment unit configured to adjust a temperature of the substrate.

2. The liquid ejection head according to claim 1, wherein two protruding portions are provided in one ejection port.

3. The liquid ejection head according to claim 2, wherein an interval between leading ends of the two protruding portions provided in the one ejection port is equal to or larger than 2.0 μm and equal to or smaller than 5.0 μm.

4. The liquid ejection head according to claim 1, wherein the protruding portion has a width becoming smaller toward a center of the ejection port.

5. The liquid ejection head according to claim 1, wherein the liquid ejection head is configured to flow liquid at a flow rate of 1.0 mm/s to 250 mm/s.

6. The liquid ejection head according to claim 1, wherein the liquid ejection head is a page wide type liquid ejection head including a plurality of the element substrates.

7. The liquid ejection head according to claim 6, wherein the plurality of element substrates is linearly arrayed.

8. The liquid ejection head according to claim 6, wherein an external shape of the plurality of element substrates is a parallelogram.

9. The liquid ejection head according to claim 1, wherein the energy generation element is a heater element configured to generate heat energy to be used to eject liquid.

10. The liquid ejection head according to claim 1, wherein liquid in a plurality of the pressure chambers is circulated between the plurality of pressure chambers and an outside of the liquid ejection head.

11. The liquid ejection head according to claim 1, wherein the liquid ejection head is configured to eject ink.

* * * * *